US012627448B2

(12) United States Patent
Niu et al.

(10) Patent No.: US 12,627,448 B2
(45) Date of Patent: May 12, 2026

(54) ADAPTIVE PHYSICAL DOWNLINK CONTROL CHANNEL (PDCCH) MONITORING

(71) Applicant: Apple Inc., Cupertino, CA (US)

(72) Inventors: Huaning Niu, San Jose, CA (US); Hongbo Yan, Vista, CA (US); Dawei Zhang, Saratoga, CA (US); Seyed Ali Akbar Fakoorian, San Diego, CA (US); Oghenekome Oteri, San Diego, CA (US); Sigen Ye, Whitehouse Station, NJ (US); Weidong Yang, San Diego, CA (US); Wei Zeng, Saratoga, CA (US); Hong He, San Jose, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 325 days.

(21) Appl. No.: 18/260,597

(22) PCT Filed: Jan. 7, 2022

(86) PCT No.: PCT/US2022/011552
§ 371 (c)(1),
(2) Date: Jul. 6, 2023

(87) PCT Pub. No.: WO2022/150550
PCT Pub. Date: Jul. 14, 2022

(65) Prior Publication Data
US 2024/0072973 A1      Feb. 29, 2024

Related U.S. Application Data

(60) Provisional application No. 63/136,149, filed on Jan. 11, 2021.

(51) Int. Cl.
*H04L 5/00*          (2006.01)
*H04W 72/232*      (2023.01)

(52) U.S. Cl.
CPC .......... *H04L 5/0053* (2013.01); *H04L 5/0094* (2013.01); *H04W 72/232* (2023.01)

(58) Field of Classification Search
CPC ..... H04L 5/0053; H04L 5/0094; H04L 5/001; H04L 5/0048; H04L 5/0051; H04W 72/232; H04W 72/23; Y02D 30/70
See application file for complete search history.

(56) References Cited

U.S. PATENT DOCUMENTS

| | | | |
|---|---|---|---|
| 2020/0229092 A1 | 7/2020 | Wu et al. | |
| 2020/0314748 A1 | 10/2020 | Kim et al. | |

(Continued)

FOREIGN PATENT DOCUMENTS

| | | |
|---|---|---|
| WO | 2021066998 A1 | 4/2021 |
| WO | 2021211973 A1 | 10/2021 |

OTHER PUBLICATIONS

"Discussion on DCI-Based Power Saving Adaptation During DRX Active Time", MediaTek Inc., 3GPP TSG RAN WG1 #103-e, R1-2008966, Oct. 2020, 9 pages.

(Continued)

*Primary Examiner* — Hashim S Bhatti
(74) *Attorney, Agent, or Firm* — Kilpatrick Townsend & Stockton LLP

(57)          ABSTRACT

The present application relates to devices and components including apparatus, systems, and methods to provide adaptive physical downlink control channel (PDCCH) monitoring. In particular, a unified signaling technique for adaptive PDCCH search space monitoring is descried. This signaling can indicate either one or a combination of the switching and skipping. In an example, the signaling includes multiple parts. In a first part, radio resource control (RRC) signaling is sent from the network to the device to configure the device for switching only, skipping only, or switching and skipping. In a second part, first DCI is sent from the network to the (Continued)

device to indicate the particular PDCCH monitoring configuration to use for the PDCCH search space monitoring. Thereafter, network sends second DCI in the relevant PDCCH search space, where this second DCI schedules traffic. The device performs blind decoding to determine the second DCI in order to exchange the traffic.

20 Claims, 16 Drawing Sheets

(56)                    References Cited

U.S. PATENT DOCUMENTS

| 2021/0168715 A1* | 6/2021 | Huang | H04W 52/0274 |
| 2022/0053470 A1* | 2/2022 | Chen | H04L 1/0061 |
| 2022/0240187 A1* | 7/2022 | Guo | H04W 76/30 |
| 2023/0146873 A1* | 5/2023 | Zhao | H04W 24/08 |
| | | | 370/329 |
| 2023/0209532 A1* | 6/2023 | Zhou | H04W 72/121 |

OTHER PUBLICATIONS

"Enhanced DCI-Based Power Saving Adaptation", Apple Inc., 3GPP TSG-RAN WG1 Meeting #107-e, R1-2111886, Nov. 6, 2021, 10 pages.

"Extension to Rel-16 DCI-Based Power Saving Adaptation During DRX Active Time" Guangdong Communications and Networks Institute, 3GPP TSG RAN WG1 #103-e, R1-2007701, Oct. 2020, 4 pages.

"Feature Lead Summary #11 on Reduced PDCCH Monitoring", Moderator (Apple Inc.), 3GPP TSG-RAN WG1 #103-e, R1-2009839, Nov. 2020, 18 pages.

"On Power Saving Adaptation During the DRX Active Time", Sony, 3GPP TSG RAN WG1#103e, R1-2009299, Oct. 2020, 5 pages.

"PDCCH Based Power Saving Channel Design for UE Power Saving", Apple Inc., 3GPP TSG RAN Meeting #102-e, R1-2006529, Aug. 2020, 3 pages.

"PDCCH-Based Power Saving Signal/Channel", Huawei, 3GPP TSG RAN WG1 Meeting #98bis, R1-1910076, Oct. 2019, 21 pages.

PCT/US2022/011552 , "International Search Report and Written Opinion", , 20 pages.

The International Application No. PCT/US2022/011552, "International Preliminary Report on Patentability," mailed Jul. 20, 2023, 14 pages.

"PDCCH skipping", 3rd Generation Partnership Project Technical Specification Group Radio Access Network Working Group 1 Meeting #98, R1-1908608, Aug. 26-30, 2019, 5 pages.

Chinese Patent Application No. 202280009706.7, "Office Action", Jan. 13, 2026, 11 pages.

* cited by examiner

800

Sending, to a user equipment (UE), radio resource control (RRC) signaling to configure a plurality of physical downlink control channel (PDCCH) monitoring configurations 802

Sending, to the UE, first download control information (DCI) that indicates a PDCCH monitoring configuration of the plurality of PDCCH monitoring configurations, wherein the PDCCH monitoring configuration includes a switching configuration to indicate a PDCCH monitoring periodicity or a skipping configuration to indicate a number of slots between PDCCH search spaces 804

Sending, to the UE, second DCI in a PDCCH search space based on the PDCCH monitoring configuration 806

Figure 8

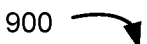

900

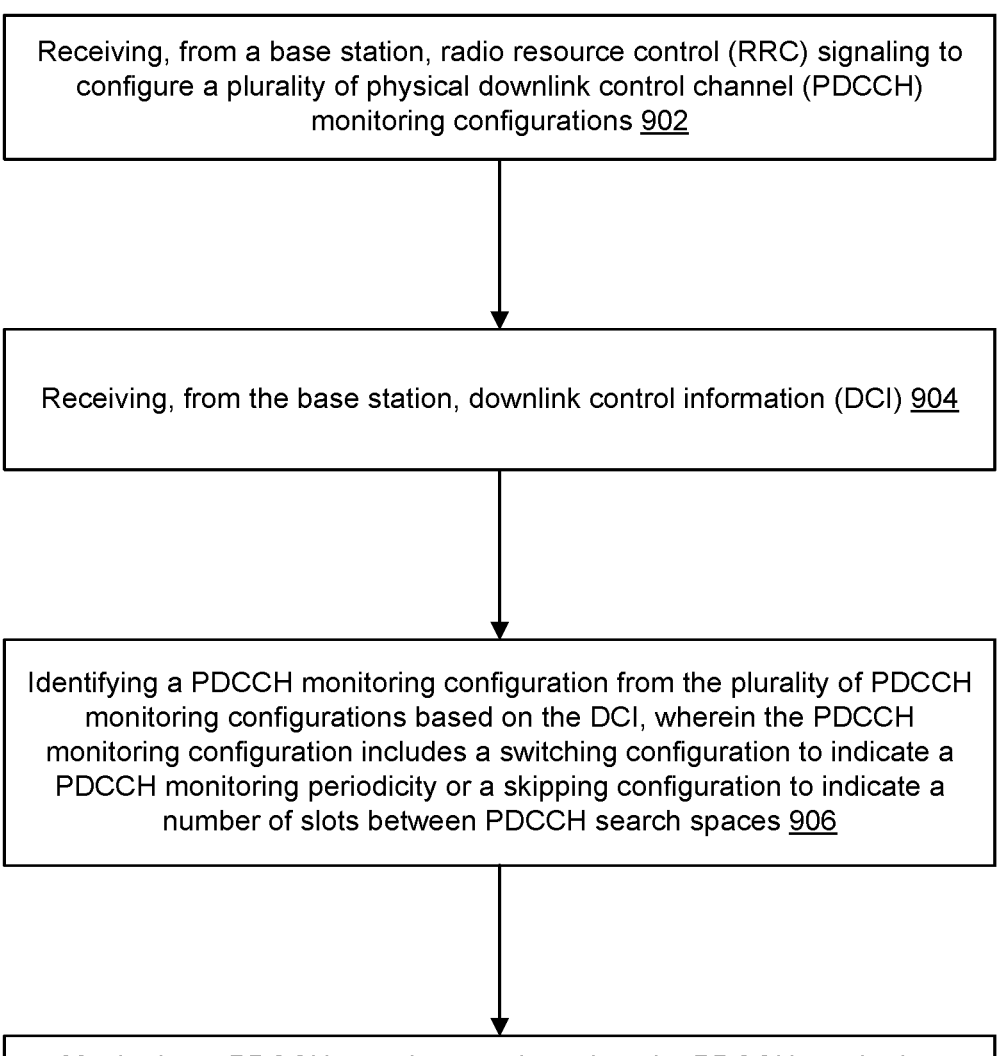

Receiving, from a base station, radio resource control (RRC) signaling to configure a plurality of physical downlink control channel (PDCCH) monitoring configurations 902

Receiving, from the base station, downlink control information (DCI) 904

Identifying a PDCCH monitoring configuration from the plurality of PDCCH monitoring configurations based on the DCI, wherein the PDCCH monitoring configuration includes a switching configuration to indicate a PDCCH monitoring periodicity or a skipping configuration to indicate a number of slots between PDCCH search spaces 906

Monitoring a PDCCH search space based on the PDCCH monitoring configuration 908

Figure 9

ADAPTIVE PHYSICAL DOWNLINK CONTROL CHANNEL (PDCCH) MONITORING

CROSS REFERENCE TO RELATED APPLICATIONS

This application is a U.S. National Stage Application under 35 U.S.C. § 371 of International Patent Application No. PCT/US2022/011552, filed Jan. 7, 2022, which claims the benefit of U.S. Provisional Application No. 63/136,149, filed Jan. 11, 2021, which are hereby incorporated by reference in their entirety.

BACKGROUND

Fifth generation mobile network (5G) is a wireless standard that aims to improve upon data transmission speed, reliability, availability, and more. This standard, while still developing, includes numerous details relating to various aspects of power savings in support of wireless communication.

BRIEF DESCRIPTION OF THE DRAWINGS

FIG. 8 illustrates an example of an operational flow/algorithmic structure for adaptive PDCCH search space monitoring in accordance with some embodiments.

FIG. 9 illustrates another example of an operational flow/algorithmic structure for adaptive PDCCH search space monitoring in accordance with some embodiments.

DETAILED DESCRIPTION

Figure 1:
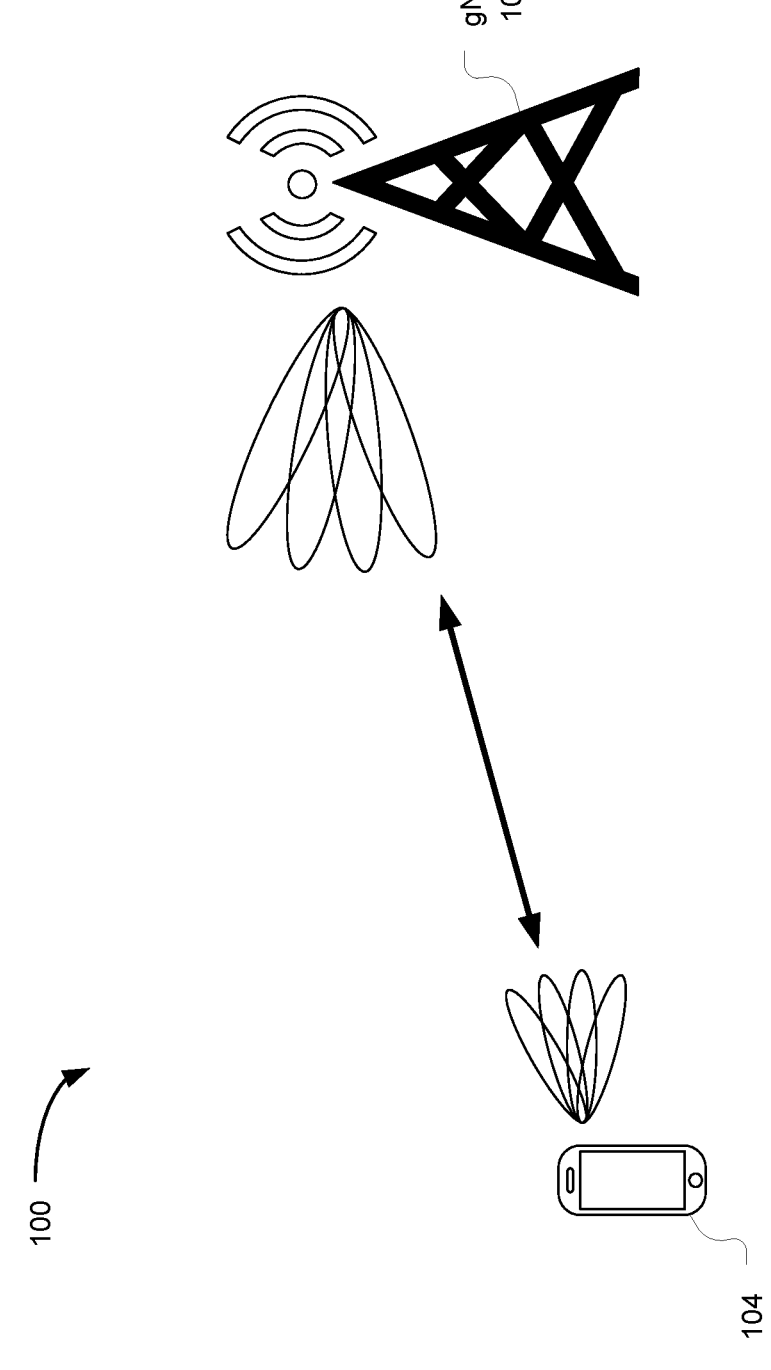
FIG. 1 illustrates an example of a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Effort is made in the telecommunication industry to improve the power consumption of equipment that is compliant with the fifth generation mobile network (5G). Some of this effort is reflected in the 5G wireless standard. For example, the 5G wireless standard supports a connected mode, an idle mode, and an inactive mode. In a connected mode, a device can receive and/or send traffic from/to a network. If no traffic exists, the device can move to the idle mode and then, depending on the inactivity, to the inactive mode. In the idle and inactive modes, power savings can be achieved relative to the connected mode, with the inactive mode providing the most power saving. Further, within the connected mode, the 5G wireless standard supports discontinuous reception (DRX) for additional power saving. During an "on duration" of a DRX cycle, the device wakes up and monitors a physical downlink control channel (PDCCH) search space in a slot for downlink control information (DCI) that schedules the traffic exchange with the network. If no traffic is scheduled, the device enters a sleep mode, whereby it consumes less power. If traffic is scheduled, the device remains awake to then receive and/or transmit the traffic from/to the network. In 5G, a slot represents a unit of time that can be dynamically adjusted. A PDCCH search space refers to an area in the downlink resource grid where PDCCH may be carried. The device performs blind decoding throughout PDCCH search spaces trying to find PDCCH data (e.g., DCI).

A proposal aimed to increase the power saving for a connected mode DRX (c-DRX) includes switching the PDCCH search space monitoring from every slot to slot intervals (e.g., every two slots). Another proposal aimed to increase the power saving for c-DRX includes skipping the PDCCH search space monitoring by a certain slot interval (e.g., no PDCCH search space monitoring is performed during twelve consecutive slots).

Embodiments of the present disclosure relate to providing a unified signaling technique for adaptive PDCCH search space monitoring. This signaling can indicate either one or a combination of the switching and skipping. In an example, the signaling includes multiple parts. In a first part, radio resource control (RRC) signaling is sent from the network to the device to configure the device for switching only, skipping only, or switching and skipping. The resulting configurations can be referred to herein as "PDCCH monitoring configurations." In a second part, first DCI is sent from the network to the device to indicate the particular PDCCH monitoring configuration to use for the PDCCH search space monitoring. Thereafter, network sends second DCI in the relevant PDCCH search space, where this second DCI schedules traffic. In turn, the device performs blind decoding to determine the second DCI in order to exchange the traffic.

To minimize the signaling overhead, existing DCI formats can be re-used. In particular, bits within existing DCI fields can be repurposed to indicate the particular PDCCH monitoring configuration from the multiple PDCCH monitoring configurations. Alternatively, a minimum number of bits are added. To further minimize the signaling overhead, a timer-based approach can also be adopted. After the first DCI is sent, the same PDCCH monitoring configuration may be desired for a longer duration (e.g., continue the skipping for another twelve slots) or a different PDCCH monitoring may be desired (e.g., skipping for an additional sixteen slots, or switching from a two slot periodicity to a four slot periodicity). To avoid the need (and associated signaling overhead) to send another DCI for updating the PDCCH monitoring configuration (e.g., the new skipping duration and/or switching periodicity), a timer can be used. In particular, the device can start the timer. Upon determining that the second DCI was not received before the expiration of the second timer, the device can automatically change the skipping duration and/or the switching periodicity.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network, and that may be configured as an access node in the communications network. A UE's access to the communications network may be managed at least in part by the base station, whereby the UE connects with the base station to access the communications network. Depending on the radio access technology (RAT), the base station can be referred as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a PDCCH; and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DCI, to inform the UE 104 of these QCL relationships.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In various embodiments of the present disclosure, a UE and a base station, such as the UE 104 and the gNB 108, support a connected mode in which the UE can exchange traffic with the base station (e.g. send and/or receive data). In the connected mode, the UE and the base station can also support DRX, referred to herein as c-DRX, to improve the power consumption of the UE. During the on duration of a DRX cycle, the base station can schedule traffic exchange for the UE. To do so, the base station sends DCI to the UE, where the DCI schedules the traffic exchange. DCI can be sent on the PDCCH and can indicate downlink/uplink resource's for PDSCH/PUSCH.

Generally, the UE can monitor a candidate set of PDCCHs in one or more control resource sets (CORESETs) on an active downlink (DL) bandwidth part (BWP) on each activated serving cell according to corresponding search spaces. The monitoring can include decoding (or attempting to decode) some or all PDCCH candidates in the candidate set according to monitored DCI format formats. The candidate set for the UE to monitor can be defined in terms of PDCCH search spaces. A search space can be a common search space (CSS) or a UE-specific search space (USS), generally referred to herein as PDCCH search spaces. In the c-DRX, the UE can monitor PDCCH candidates in slots that are within the on duration of the DRX cycle.

Figure 2:
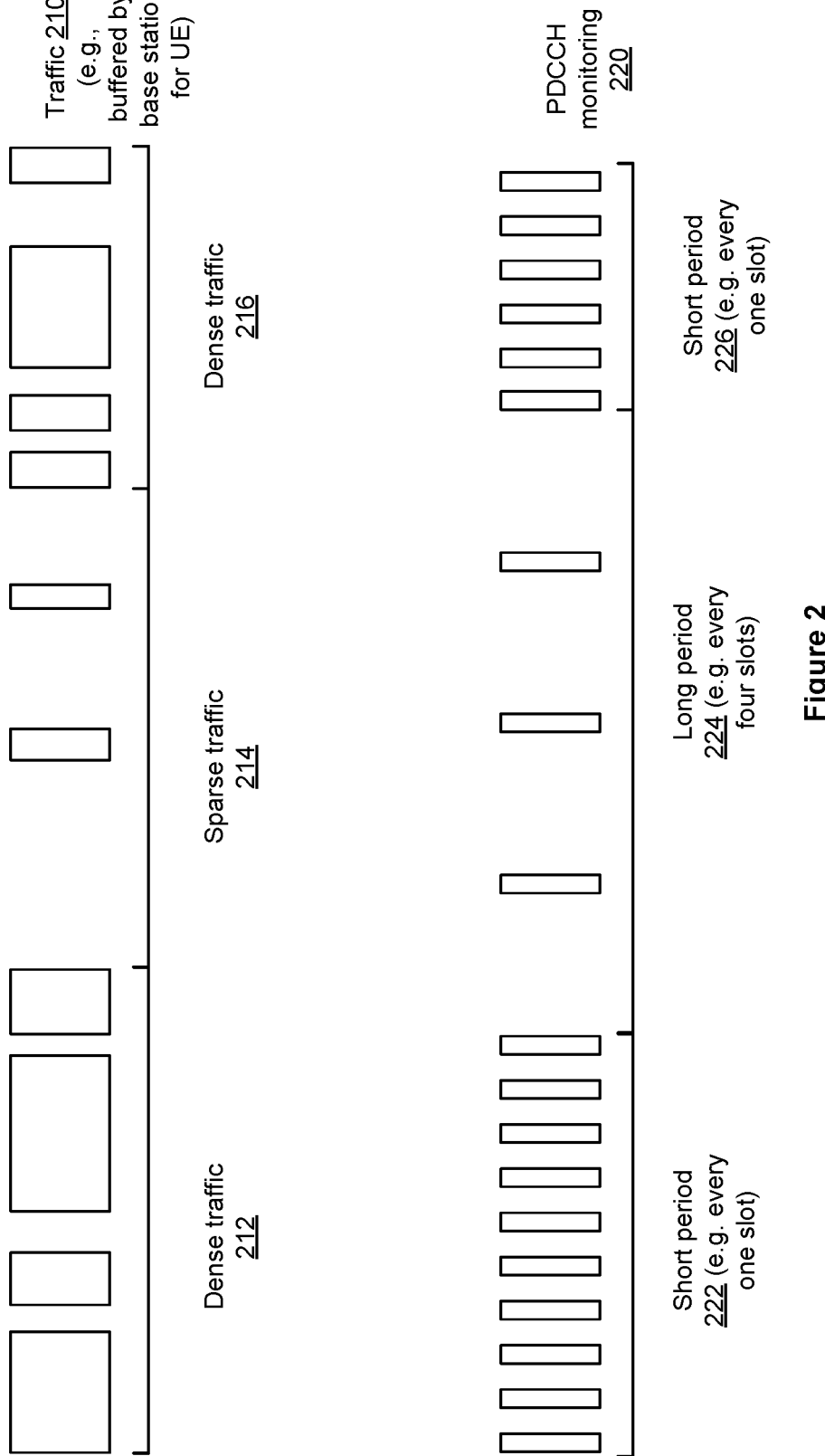
FIG. 2 illustrates an example of switching PDCCH monitoring periodicity in accordance with some embodiments.
Figure 3:
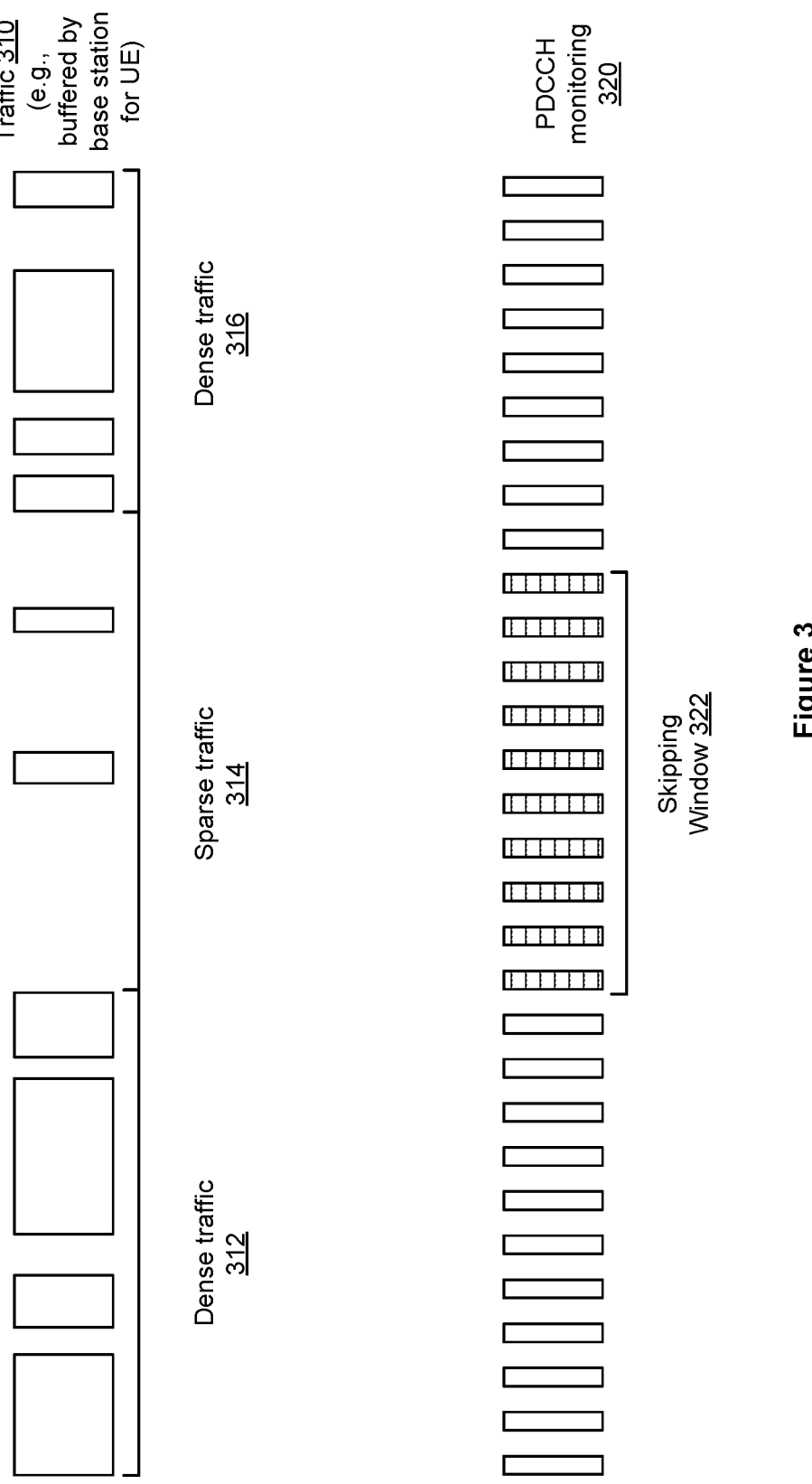
FIG. 3 illustrates an example of skipping PDCCH search space monitoring with some embodiments.
Figure 4:
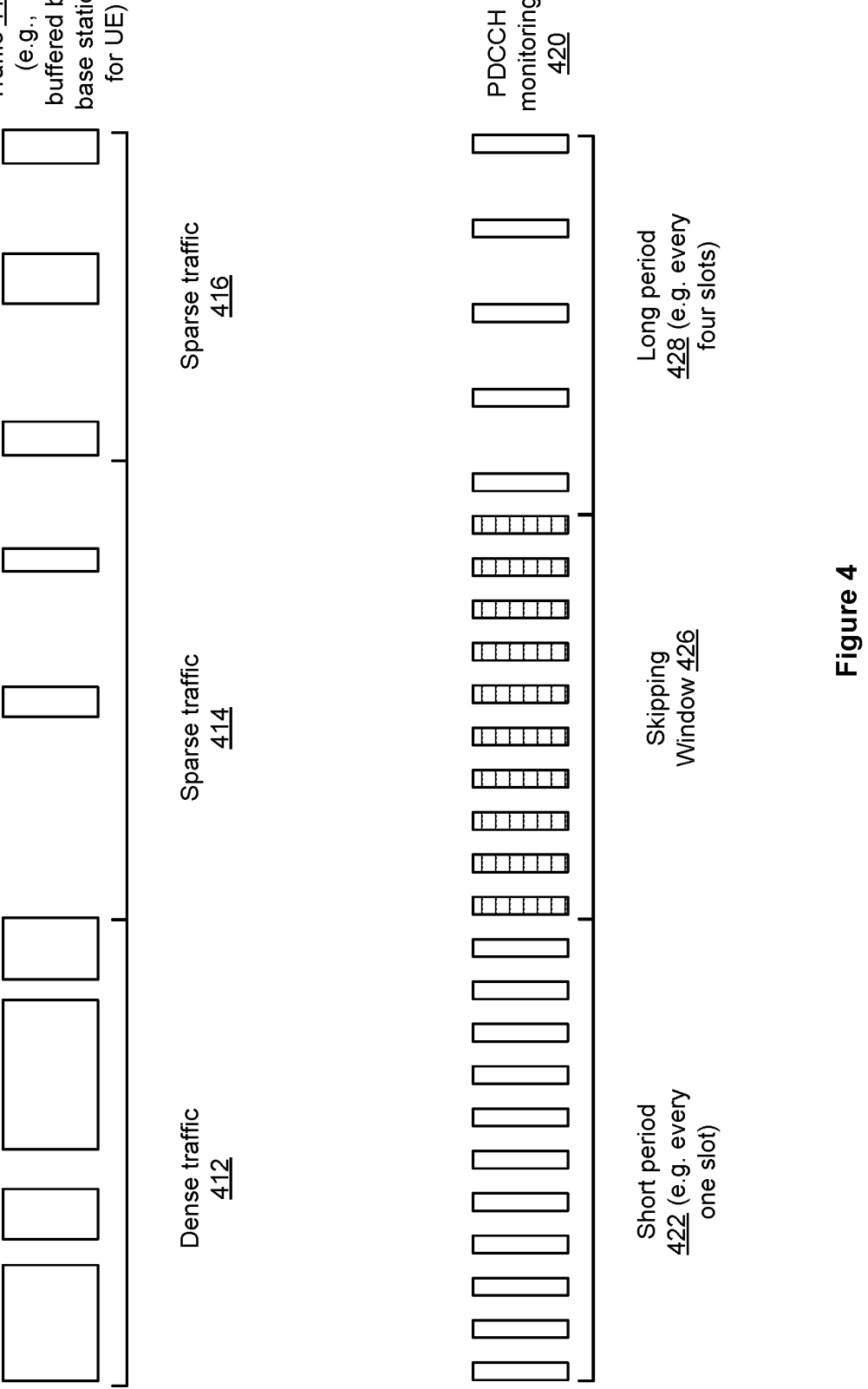
FIG. 4 illustrates an example of switching PDCCH monitoring periodicity and skipping PDCCH monitoring in accordance with some embodiments.

For PDCCH monitoring purposes, each BWP configured for the UE can be associated with up to about three CORE-SETs and up to ten PDCCH search space sets. In particular, the number of PDCCH candidates per aggregation level (AL) can be configured among {0, 1, 2, 3, 4, 5, 6, 8} for each PDCCH search space. Monitoring periodicities of different PDCCH search space sets can be different and be selected from a set of possible values of {1, 2, 4, 5, 8, 10, 16, 20} slots, for example. Additionally or alternatively, the PDCCH monitoring (or blind decoding) can be skipped during a slot window have a length of {4, 18, 12, 16} slots, for example. FIG. 2 illustrates switching between different monitoring periodicities. FIG. 3 illustrates skipping the PDCCH monitoring for a number of slots. And FIG. 4 illustrates a combination of the switching and the skipping. Each of these figures is described herein below.

Signaling between the base station and the UE is needed to indicate the monitoring periodicity and/or the number of slots to skip. Embodiments of the present disclosure relate to such signaling. In an example, RRC information and DCI are used for the signaling such that the signaling can allow adaptive PDCCH monitoring, with little or no increase to the signaling overhead. In particular, the RRC information can include a candidate set of PDCCH monitoring configurations, each PDCCH monitoring configuration being a switching configuration or a skipping configuration (i.e., a switching configuration only, a skipping configuration only, or a combination of a switching configuration and a skipping configuration). Generally, a PDCCH configuration is a configuration that is set-up for the UE by the base station via RRC signaling and can be referred to herein also as an "RRC configuration" to indicate the RRC nature of the set-up. A switching configuration indicates a specific monitoring periodicity from the set of {1, 2, 4, 5, 8, 10, 16, 20} slots. A skipping configuration indicates a specific number of slots to skip from the set of {4, 8, 12, 16} slots. DCI information can include the particular PDCCH monitoring configuration(s) to use from the set. For example, the DCI information can indicate that a monitoring periodicity of two slots and/or eight slots to skip. For instance, the DCI can include bits, whereby the combination of bit values indicates the PDCCH monitoring configuration(s) (e.g., two DCI bits are used, whereby "1 1" indicate the two slot monitoring periodicity and/or the eight skip slots).

FIG. 2 illustrates an example of switching PDCCH monitoring periodicity in accordance with some embodiments. The top portion of FIG. 2 shows traffic 210, whereas its bottom portion shows PDCCH search space monitoring 220 (referred to herein as PDCCH monitoring for brevity).

In an example, the traffic is downlink traffic that includes data buffered by a base station (e.g., gNB 108 of FIG. 1) for transmission to a UE (e.g., the UE 104 of FIG. 1). However, the embodiments are not limited as such and similarly apply to uplink traffic from the UE to the base station. In the illustration of FIG. 2, the traffic 210 is variable over time. At one point, the traffic is dense (illustrated as dense traffic 212), where a large amount of data is buffered for transmission to the UE. Thereafter, the traffic 210 is sparse (illustrated as sparse traffic 214), where a small amount of data, if any, is buffered for transmission to the UE. Yet again, the traffic 210 becomes dense (illustrated as dense traffic 216). As used herein, "dense" and "sparse" are relative terms, where dense refers to the amount of traffic being larger than a first threshold, and where sparse refers to the amount of traffic being smaller than the first threshold or a smaller second threshold. The specific threshold(s) depend on a number of factors such as the total amount of traffic per UE, per component carrier, and the like.

Referring now to the PDCCH monitoring 220, the PDCCH monitoring periodicity is adaptively adjusted depending on the traffic 210. In particular, when the traffic 210 is dense (as in the dense traffic 212 or the dense traffic 216), the periodicity at which PDCCH search spaces are monitored is increased. In comparison, when the traffic 210 is sparse (as in the sparse traffic 214), the periodicity at which PDCCH search spaces are monitored is decreased.

In an example, PDCCH monitoring periodicity refers to a number of slots at which DCI may be expected and blind decoding of a PDCCH search space is to be performed to decode or attempt to decode the DCI. The PDCCH monitoring periodicity can be also referred to as search space (SS) periodicity or switching period. For example, a PDCCH monitoring periodicity of two indicates that DCI may be expected every two slots and that PDCCH search spaces are to be monitored every two slots. A slot is a unit of time having a duration based on the sub-carrier spacing (SCS). For instance, the slot duration is 1 millisecond (ms), 0.5 ms, 0.25 ms, 0.125 ms, and 0.0625 ms for SCS of 15 kHz, 30 kHz, 60 kHz, 120 kHz, and 240 kHz, respectively.

In the illustration of FIG. 2, for the dense traffic 212, a short period 222 is used, whereby the number of slots can be smaller or equal to two, for example (e.g., PDCCH search spaces are to be monitored every one slot or every two slots for potential DCI). For the sparse traffic 2214, a long period 224 is used, whereby the number of slots can be larger than two (e.g., PDCCH search spaces are to be monitored every four slots, or a larger number of slots, for potential DCI). Similar to the dense traffic 212, for the dense traffic 216, the same or a different short period 226 is used, whereby the number of slots can be smaller or equal to two, for example. As such, the PDCCH monitoring 220 uses different periodicities over time, where this monitoring switches between long and short periods depending on the traffic 210.

FIG. 3 illustrates an example of skipping PDCCH search space monitoring with some embodiments. The top portion of FIG. 3 shows traffic 310, whereas its bottom portion shows PDCCH monitoring 320. The traffic is similar to the traffic 210 and includes dense traffic 312, sparse traffic 314, and dense traffic 316. Similarities are not repeated herein in the interest of brevity.

In an example, the PDCCH monitoring 320 is performed over a number of slots. When the traffic 310 is dense (as in the case of the dense traffic 312 and the dense traffic 316), DCI may exist and the PDCCH search spaces are monitored (illustrated with the blank rectangles). However, when the traffic 310 is sparse (as in the case of the sparse traffic 316), the PDCCH monitoring 320 may be skipped. The skipping can include not receiving PDCCH (e.g., by deactivating a radio reception path) or receiving PDCCH and not performing blind decoding, for instance. The skipping can occur over a number of slots (e.g., from the set of {4, 8, 12, 16} slots), shown as a skipping window 322 (also referred to as a stepping size). During the skipping window 322, the PDCCH monitoring 320 is not performed at slots where, otherwise, this monitoring 320 would have been performed (these slots are illustrated with rectangles with horizontal lines in FIG. 3). As such, the PDCCH monitoring 320 can be skipped during the skipping window 322, and the length of this window 322 (e.g., the number of slots) can depend on the traffic 310.

FIG. 4 illustrates an example of switching PDCCH monitoring periodicity and skipping PDCCH monitoring in accordance with some embodiments. The top portion of FIG. 4 shows traffic 410, whereas its bottom portion shows PDCCH monitoring 420. The traffic is similar to the traffic 210 and includes dense traffic 412 and sparse traffic 414. However, rather than including the dense traffic 216, the traffic 410 further includes sparse traffic 416 (although denser than the sparse traffic 414). Similarities between the two figures are not repeated herein in the interest of brevity.

In an example, the PDCCH monitoring 420 is adaptive, where both switching and skipping are used. In particular, for the dense traffic 412, a short period 422 is used, whereby the number of slots can be smaller or equal to two, for example (e.g., PDCCH search spaces are to be monitored every one slot or every two slots for potential DCI). For the sparse traffic 414, skipping is used during a skipping window 426, whereby the PDCCH monitoring 420 is not performed. For the sparse traffic 416, because it is denser than the sparse traffic 414, the PDCCH monitoring is performed but a long period 428 is used, whereby the number of slots can be larger than two (e.g., PDCCH search spaces are to be monitored every four slots, or a larger number of slots, for potential DCI; this larger number can be smaller than the length of the skipping window 426). As such, the PDCCH monitoring 420 uses one or more periodicities and one or more skipping windows over time depending on the traffic 410.

Figure 5:
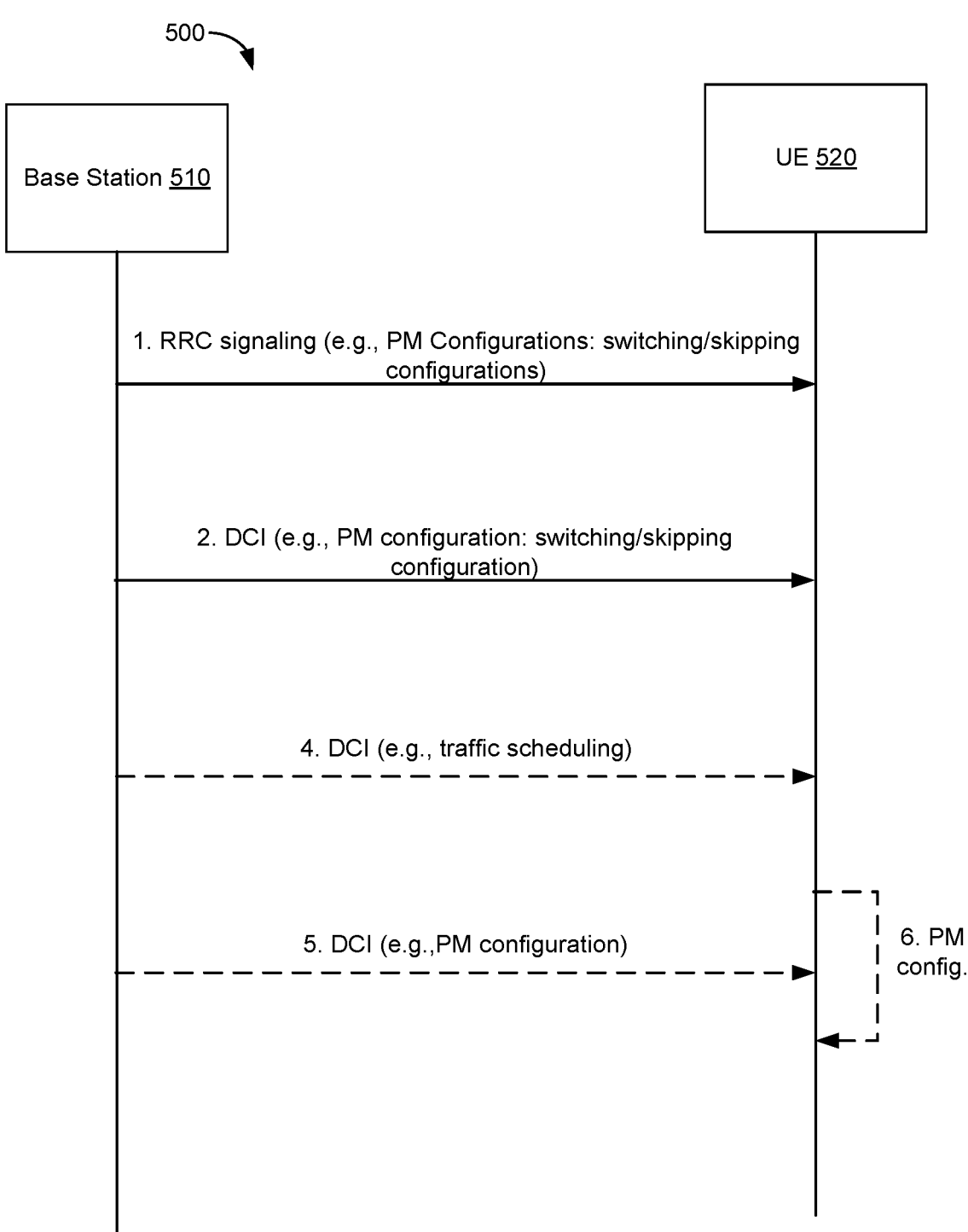
FIG. 5 illustrates an example of a diagram for signaling adaptive PDCCH search space monitoring in accordance with some embodiments.

FIG. 5 illustrates an example of a diagram 500 for signaling adaptive PDCCH search space monitoring in accordance with some embodiments. In an example, a base station 510 is in communication with a UE 520 over one or more serving cells, such as a primary cell (PCell) and, optionally, a secondary cell (SCell) and/or a primary secondary cell (PSCell). The base station 510 and the UE 520 are examples of the gNB 108 and UE 104, respectively, of FIG. 1. Initially, the base station 510 configure, via RRC signaling, the UE 520 for adaptive PDCCH monitoring including any or a combination of switching and skipping. Subsequently, the base station 510 indicates, to the UE 520 and via DCI, the specific configuration to use for the switching and/or skipping.

For c-DRX, the base station 510 can use an RRC message (e.g., RRC ConnectionReconfiguration or RRC Connection Setup) to inform the UE 520 about parameters of the c-DRX (e.g., DRX cycle, on duration, wake-up timing, etc.). The RRC message or another RRC message can be used to also configure the UE 520 about PDCCH monitoring configurations that are usable in the adaptive PDCCH monitoring when c-DRX is configured. These PDCCH monitoring configurations represent a candidate set of switching and/or skipping configurations. In particular, each PDCCH monitoring configuration from this set represents a candidate switching configuration or skipping configuration that can be used. A switching configuration indicates a specific monitoring periodicity (e.g., a switching period), whereas a skipping configuration indicates a specific number of slots to skip (e.g., a skipping window). As such, the PDCCH monitoring configurations configure the UE 520 to, for instance, use {1, 2, 4} slots for switching and/or {8, 12} slots for skipping, or some other arrangements of switching periods and/or skipping windows.

Thereafter, the base station 510 sends DCI informing the UE 520 about the specific PDCCH monitoring configuration to use from the candidate set of PDCCH monitoring configurations. For instance, the base station 510 informs the UE 520 to use the two-slot switching periodicity and/or the eight-slot skipping window.

In an example, no new DCI format is needed. Instead, existing DCI formats can be repurposed to indicate the PDCCH monitoring configuration (e.g., the switching configuration and/or the skipping configuration) with minimal to no increase to the signaling overhead (e.g., the number of bits in the DCI). Generally, depending on whether traffic is to be scheduled or not, the base station 510 can determine and use a specific DCI format (e.g., any of formats 0_1, 0_2, 11, 1_2, 2_0, and 2_6). If traffic is to be scheduled, the base station 510 sends DCI that schedules the traffic and indicates the PDCCH monitoring configuration. This DCI is referred to herein as "scheduling DCI" and can have any of formats 0_1, 0_2, 1_1, and 1_2. Conversely, if no traffic is to be scheduled, the base station 510 sends DCI that does not schedule traffic but yet indicates the PDCCH monitoring configuration. This DCI is referred to herein as "non-scheduling DCI" and can have any of formats 1_1, 2_0, and 2_6.

Next, the UE 520 receives the DCI (scheduling or non-scheduling) and determines the specific PDCCH monitoring configuration to use. Based on the indicated switching period and/or skipping window, the UE 520 monitors PDCCH search spaces over the subsequent slots. Second DCI may be received (as indicated with the dashed arrow) to schedule traffic. Of course, if no traffic exists, the second DCI is not sent by the base station 510 and the UE 520 does not receive it. Further, the second DCI may not, but can, indicate another PDCCH monitoring configuration (e.g., another switching configuration and/or skipping configuration). This DCI is detected and traffic is exchanged, as applicable.

Further, the base station 510 may determine that another PDCCH monitoring configuration (e.g., switching configuration and/or skipping configuration) is to be used after some time interval. Different approaches can be implemented to indicate this update to the UE 520. In one approach, another DCI (scheduling or non-scheduling) is sent to the UE 520 and is further described in FIG. 10. In another approach, a set of timers is used, whereby, upon an expiration of a timer and upon no detection of DCI, the UE 520 can automatically use the other PDCCH monitoring configuration, as further described in FIGS. 11-13.

Although FIG. 5 illustrates a single base station and a single UE, the embodiments of the present disclosure are not limited as such and similarly apply to multiple base stations and/or multiple UEs. For instance, DCI can be received on one cell (e.g., PCell), optionally schedules traffic on multiple serving cells (e.g., in the case of cross-carrier scheduling), and can indicate for each serving cell or for a group of the serving cells the applicable PDCCH monitoring configuration. Alternatively, DCI can be received per serving cell to indicate the PDCCH monitoring configuration to use for that serving cell. In both situations, one or more base stations can manage the serving cells. Similarly, a UE can belong to a group of UEs using a set of serving cells managed by a set of base stations. The PDCCH monitoring configuration indicated in DCI can apply to the UE or to the group of UEs. A description of such DCIs is provided herein next.

Figure 6:
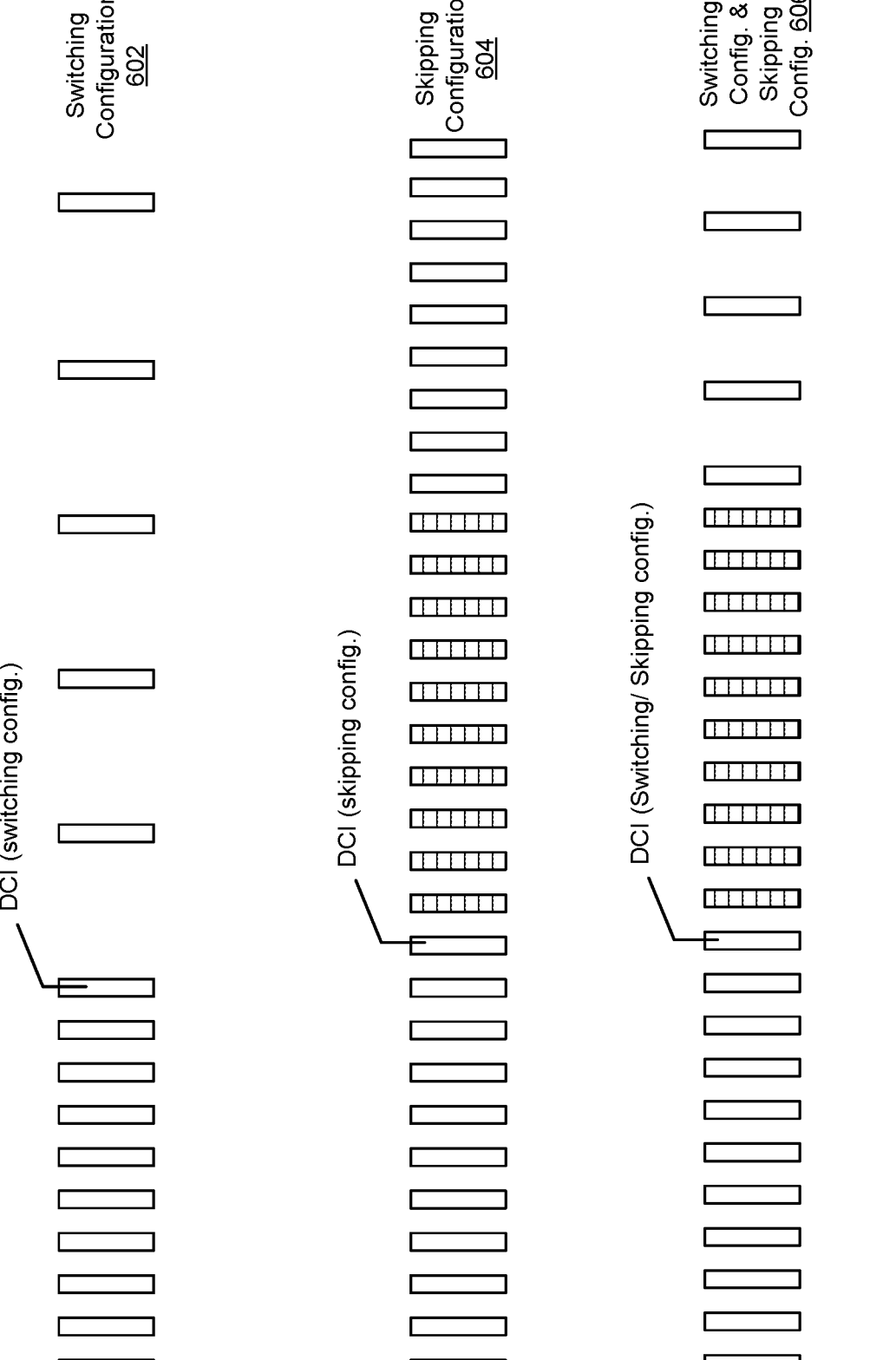
FIG. 6 illustrates an example of downlink control information (DCI)-based adaptive PDCCH search space monitoring in accordance with some embodiments.

FIG. 6 illustrates an example of DCI-based adaptive PDCCH search space monitoring in accordance with some embodiments. As explained herein above, RRC signaling is used to configure a UE to use a candidate set of PDCCH monitoring configurations for adaptive PDCCH monitoring. This candidate set includes switching configurations only, skipping configurations only, or both switching configurations and skipping configurations. Following the RRC signaling, DCI is used to indicate the specific PDCCH monitoring configuration (e.g., the switching configuration and/or the skipping configuration) to use from the candidate set.

Figure 10:
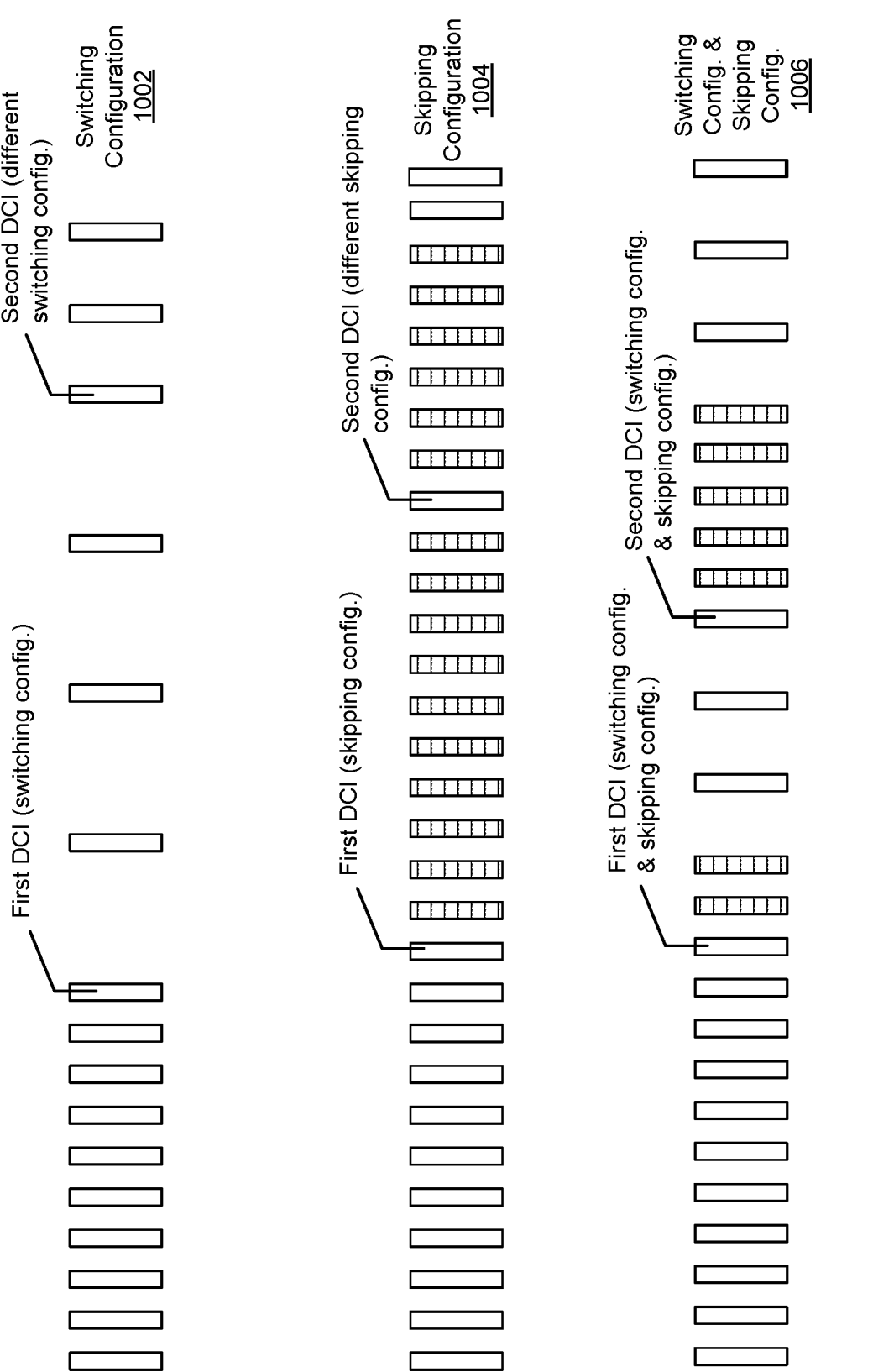
FIG. 10 illustrates an example of DCI-based update for adaptive PDCCH search space monitoring in accordance with some embodiments.
Figure 11:
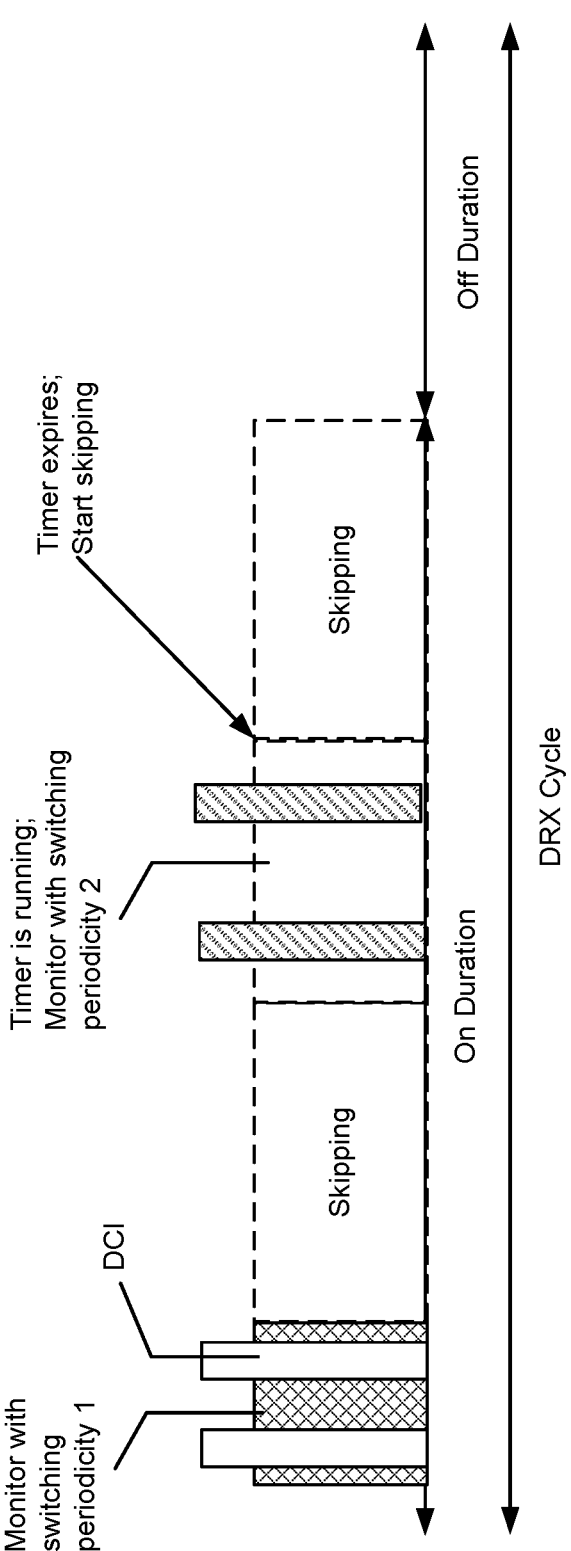
FIG. 11 illustrates an example of timer-based update for adaptive PDCCH search space monitoring in accordance with some embodiments.
Figure 12:
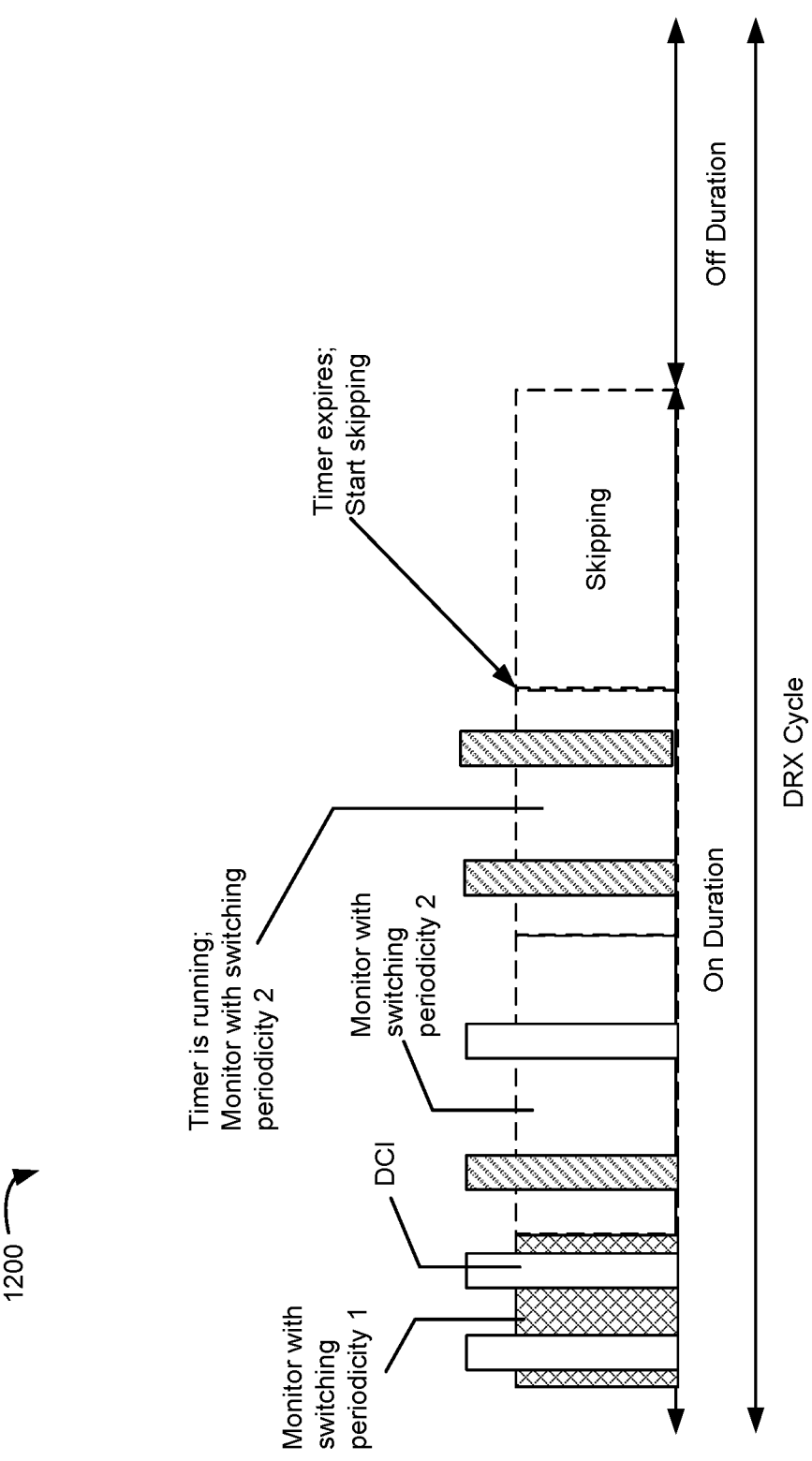
FIG. 12 illustrates another example of timer-based update for adaptive PDCCH search space monitoring in accordance with some embodiments.

As illustrated in FIG. 6, to indicate a switching configuration 602, DCI can be detected in a PDCCH search space in a slot. This DCI can be a scheduling DCI or a non-scheduling DCI. The bits of the DCI can indicate the specific switching configuration 602 to use, such as the switching period. This switching period can remain in effect across different DRX cycles until another DCI is received and indicates another PDCCH monitoring configuration to use for the PDCCH monitoring, as illustrated in FIG. 10, or until an expiration of a timer, as illustrated in FIG. 12. Similarly, to indicate a skipping configuration 604, DCI can be detected in a PDCCH search space in a slot. This DCI can be scheduling DCI or a non-scheduling DCI. The bits of the DCI can indicate the specific skipping configuration 604 to use, such as the skipping window. Upon an end of the skipping window, the PDCCH monitoring can revert back. Alternatively, the skipping window can be renewed, or another skipping configuration can be indicated in another DCI, as illustrated in FIG. 10, or can be automatically used depending on a timer, as illustrated in FIG. 11. Also, to indicate a switching configuration and a skipping configuration 606, DCI can be detected in a PDCCH search space in a slot. This DCI can be a scheduling DCI or a non-scheduling DCI. The bits of the DCI can indicate the specific switching configuration and skipping configuration 606 to use, such as the switching period and skipping window. Skipping can occur first, followed by switching. Alternatively, switching can be performed for a period of time (e.g., based on a timer) and followed by skipping (e.g., based on the timer's expiration). In all three cases, the DCI can be received during an on duration of a DRX cycle to trigger the specific PDCCH monitoring configuration.

Based on the number of PDCCH monitoring configurations that form the candidate set and that are configured based on the initial RRC message, a number of bits (e.g., one, two, or three) are used in the DCI. For instance, "$2^n$" PDCCH monitoring configurations are signaled and are either switching configurations only or skipping configurations only. In this case, "n" bits can be used in the DCI. For instance, if two PDCCH monitoring configurations (e.g., two switching configurations only or two skipping configurations only) are indicated in the RRC message, one bit is used, where each bit value (e.g., zero or one) corresponds to one of the two PDCCH monitoring configurations. In comparison, if four PDCCH monitoring configurations are indicated (e.g., four switching configurations only or four skipping configurations only), two bits are used, where each pair of bit values (e.g., zero-zero, zero-one, one-zero, and one-one) corresponds to one of the four PDCCH monitoring configurations. In another example, "n" bits are used and can indicate more than "$2^n$" combinations of switching and skipping configurations.

To illustrate, consider the following three examples. In a first example, the UE is configured for skipping only, with skipping windows (or stepping sizes) of {4, 8, 12, 16} slots. Two bits can be used to indicate the skipping window to use (e.g. a zero-zero indicates a four-slot skipping window; a zero-one indicates an eight-slot skipping window, a one-zero indicates a twelve-slot skipping window, and a one-one indicates a sixteen-slot skipping window).

In a second example, the UE is configured for switching only, with switching periods (or SS periodicities) of {1, 2, 4, 6} slots. Here also, two bits can be used to indicate the switching period to use (e.g., a zero-zero indicates a one-slot switching period; a zero-one indicates a two-slot switching period, a one-zero indicates a four-slot switching period, and a one-one indicates a six-slot switching period).

In a third example, the UE is configured for skipping and switching. Here, and referring back to the above two skipping and switching configurations, four bits can be used in the DCI (two bits to indicate the specific switching configuration and another two bits to indicate the specific skipping configuration). Alternatively, to reduce the signaling overhead, a different approach can be used. For instance, the skipping configurations can be indicated based on the switching configurations. A set of bits in the DCI indicates the switching configuration to use. Another set of bits in the DCI indicates the skipping configuration based on the indicated switching configuration. As such, the total number of bits needed to indicate the combination of switching and skipping is reduced. To illustrate, the initial RRC message configures the UE to use switching periods (or SS periodicities) of {1, 4} slots and skipping windows (or stepping sizes) of {2, 4} slots. A first bit in the DCI indicates the switching period to use. A second bit in the DCI indicates the skipping window based on the switching period. In particular, a zero value of the first bit indicates a one-slot switching period, whereas a one value of the first bit indicates a four-slot switching period. A zero value of the second bit indicates a one-slot skipping window when the first bit also has a zero value, or a two-slot skipping window when the first bit has the one value. A one value of the second bit indicates a four-slot skipping window when the first bit has a one value, or a sixteen-slot skipping window when the first bit also has the one value. This effectively results in a skipping configuration of {1, 2, 4, or 16} slots.

In an example, scheduling DCI is used to indicate the PDCCH monitoring configuration (e.g., the switching configuration and/or the skipping configuration). The scheduling DCI can have format 0_1 or 02 for uplink traffic, or format 1_1 or 1_2 for downlink traffic. These formats include padded bits or can have a dynamic size. Accordingly, "n" bits can be added thereto to indicate the specific PDCCH monitoring configuration to use for the adaptive PDCCH monitoring.

Further, the scheduling DCI can schedule traffic for the UE on a specific component carrier (CC). A component carrier can be referred to as a scheduling CC and can correspond to a serving cell and can be configured as PCell, PSCell, or an SCell. The UE may also be using other CCs. As such, multiple DCI use cases are possible. In one use case, the PDCCH monitoring configuration indicated in the DCI applies specifically to the scheduling CC and not to the other CCs. In another use case, the PDCCH monitoring configuration is applied to all CCs (e.g., the scheduling the CC and the other CCs), regardless of the CC that was used to send the DCI (e.g., regardless of the fact that the scheduling DCI is detected on the scheduling CC). The UE can be configured to implement one of the two cases, where the configuration can be set via an RRC message or by default (e.g., predefined logic or program code of the UE). In yet another use case, the base station can configure a CC grouping for the UE. For instance, an RRC message can also be initially sent to the UE to indicate an RRC configuration that identifies the CCs that form a group. This group may, but need not, include the scheduling CC. Upon receiving the DCI, the switching and/or skipping configuration indicated in this DCI applies to the PDCCH monitoring on all the CCs of the group. In the last two use cases (e.g., the PDCCH monitoring configuration for the adaptive PDCCH monitoring applies to all CCs or a group of CCs), the CCs may have different sub-carrier spacing (SCS). If so, the skipping window and/or the switching period can be based on the smallest SCS of the CCs. For instance, SCS of fifteen and thirty kHz are used, resulting in slots having durations of one and half milliseconds, respectively. In this case, the skipping window and/or the switching period are defined using the one millisecond slot, rather than the half millisecond slot.

In an example, non-scheduling DCI is used to indicate the PDCCH monitoring configuration (e.g., the switching configuration and/or the skipping configuration). The non-scheduling DCI can have format 1_1. In particular, format 1_1 can be used for indicating SCell dormancy without PDSCH scheduling if the frequency domain resource allocation (FDRA) field is set to all ones when type one-resource allocation (1RA) is used, or if the FDRA field is set to all zeros when type zero-resource allocation (0RA) us used.

When format 1_1 is used for the non-scheduling DCI, this DCI can include the additional "n" bits to indicate the PDCCH monitoring configuration to use for the adaptive PDCCH monitoring, similar to the case of a scheduling DCI having also format 1_1. Further, the non-scheduling DCI with format 1_1 includes a number of additional bits that can be repurposed for indicating the PDCCH monitoring configuration to use. These additional bits would have been used to schedule traffic and are not used in the case of the non-scheduling DCI. Some of these additional bits are used for the SCell dormancy. The remaining bits can be repurposed. These additional bits include five bits for modulation and the coding scheme of transport block one, one bit for new data indicator of transport block one, two bits for redundancy version of transport block one, four bits for hybrid automatic repeat requests (HARQ) process number, four, five, or six bits for antenna port(s) indication, and one bit for a demodulation reference signal (DMRS) sequence initialization. In other words, up to nineteen of additional bits are available. Some of nineteen additional bits (e.g., "K" bits) are used for the SCell dormancy information. The remaining "L" bits (e.g., "L=nineteen–K") can be repurposed to indicate the PDCCH monitoring configuration to use.

Different repurposing of the "L" bits is possible. In an example, the "L" bits form an explicit information field that represents a bitmap of length "N" to indicate the skipping and/or switching configuration for each cell (or CC). "N" can be the number of CCs or SCells configured for the UE. Each set of "n" bits in the bitmap corresponds to a cell and indicates the skipping and/or switching configuration for this cell. The sum of the number of these bits is equal to or smaller than the "L" bits. In another example, a large number of SCells is configured for the UE and the "L" bits are not enough to indicate the PDCCH monitoring configuration to use per SCell. In this case and similar to the scheduling DCI description above, the base station can configure groups of SCells (or CCs) for the UE (e.g., via an RRC message). In this case, the bitmap includes the "N" fields, where each "N" field corresponds to a group of SCells (or a group of CCs), and wherein the bits in an "N" field indicate the skipping and/or switching configuration of the corresponding group. Here also, if different SCSs are used in a group, the skipping window and/or the switching period can be based on the smallest SCS of the group. Similarly to the scheduling DCI format 1_1, the non-scheduling DCI format 1_1 results in PDCCH monitoring of USS.

Figure 7:
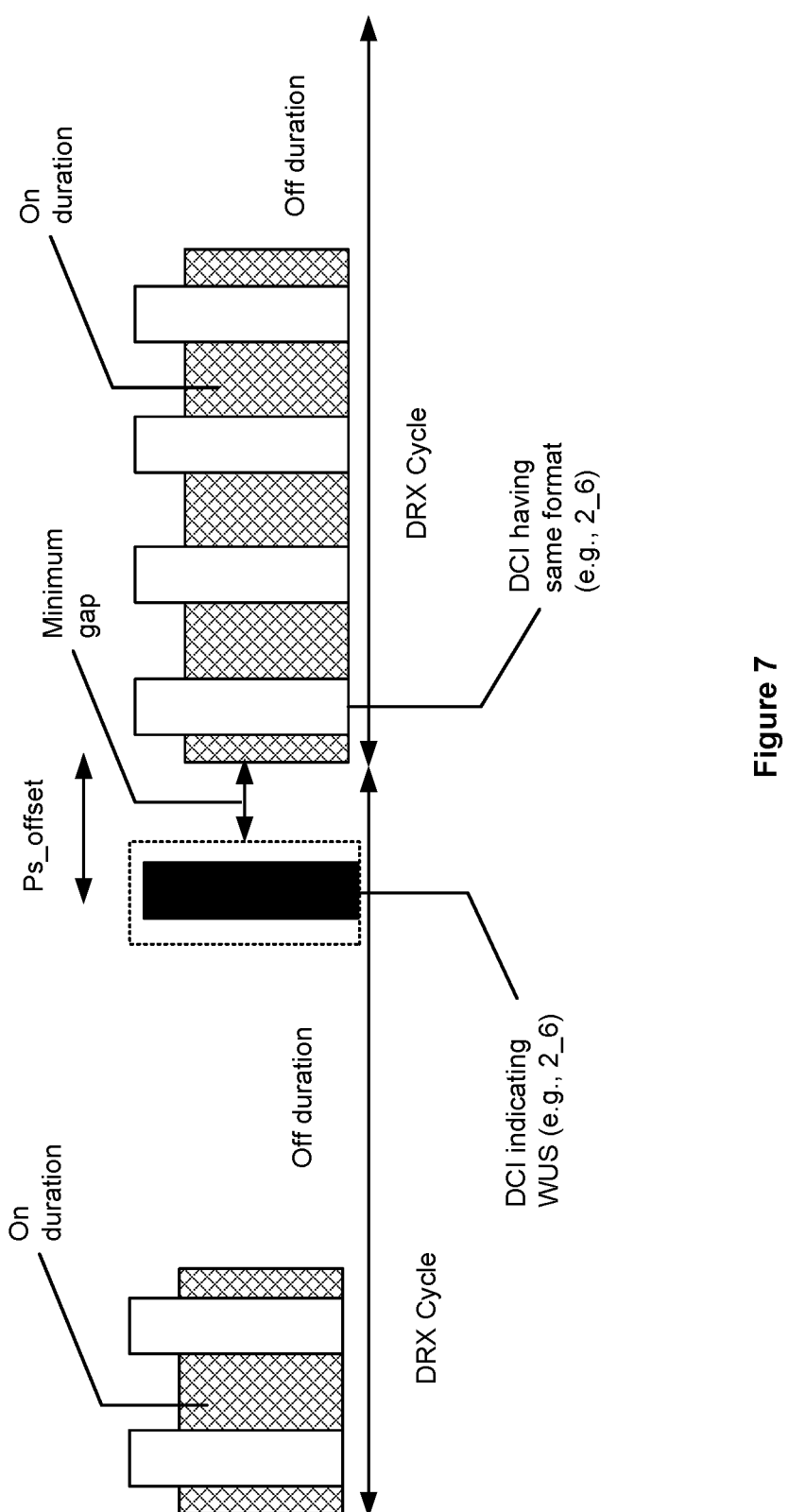
FIG. 7 illustrates an example of DCI for adaptive PDCCH search space monitoring with some embodiments.

Other formats of the non-scheduling DCI are possible, including formats 2_0 and formats 2_6. Format 20 is described herein next, whereas format 26 is illustrated in FIG. 7.

Generally, DCI format 2_0 can be used in the new radio unlicensed spectrum (NR-U) to enable search space switching depending on channel occupancy time (COT) availability. Because the unlicensed spectrum is shared with other radio access technologies (RATs), a listen-before-talk (LBT) process is used. In particular, the base station and/or the UE determine whether traffic of another RAT is occurring on a communication channel prior to transmission by the base station or the UE on this channel. To do so, the base station configures LBT parameters for the UE including, for instance, duration, clear channel assessment parameters, etc. Dynamic time division duplex (TDD) is also enabled to adapt to traffic conditions. When the LBT indicates that traffic of another RAT is occurring, a relatively short slot is used for a group of UEs to detect the LBT parameters. Otherwise, a relatively longer slot can be used and DCI format 2_0 is usable to indicate that the LBT detection can use a relatively longer period.

This DCI format 2_0 needs to be updated for the purpose of UE power saving (e.g., for c-DRX) and for licensed band use. This update is to the grouping of UEs and to the content of the DCI. As far as the UE grouping, the base station can initially inform the UE (e.g., using an RRC configuration sent in an RRC message) about groups of UEs. In this case, the DCI can include a UE bit field location indicating the specific group to which the UE belongs for the purpose of switching and/or skipping. Alternatively, the DCI is specific to one UE group and is received by the UE when it belongs to the UE group. In both cases, the UE monitors DCI format 2_0 to determine the switching and/or skipping configuration when dynamic PDCCH monitoring is enabled by RRC.

As far as the DCI content is concerned, "n" bits are used to indicate the PDCCH monitoring configuration (e.g., switching configuration and/or skipping configuration) to use for the adaptive PDCCH monitoring. "m" bits (e.g., one, two, or three bits, for instance) are also used to indicate a group of SCells (or CCs) to which the PDCCH monitoring configuration indicated by the "n" bits applies. Alternatively, for each group of SCells, "n" bits (or less) are included in the DCI to indicate the switching period and/or skipping window that apply to the group.

FIG. 7 illustrates an example of DCI for adaptive PDCCH search space monitoring 700 with some embodiments. The illustrated DCI is a non-scheduling DCI having format 2_6 and repurposed to indicate the PDCCH monitoring configuration (e.g., switching configuration and/or skipping configuration) to use.

In Rel-15 of the 3GPP NR standard, a UE is expected to perform PDCCH monitoring during the on duration across all DRX cycles. For power saving, in Rel-16 of the 3GPP NR standard, a base station can transmit a wake-up signal (WUS) to the UE ahead of an on-duration in a DRX cycle if traffic is to be scheduled for the UE during that on duration. If the UE device does not detect the WUS during the monitoring occasion (MO), it can skip the upcoming PDCCH monitoring.

DCI format 2_6 can include the WUS transmitted before each DRX cycle. In Rel-16, this DCI is sent on a PCell only and is monitored in the DRX off period (e.g., during the MO window, shown with the dotted box in FIG. 7, where this window is offset from the on duration by a minimum gap). Embodiments of the present disclosure allow the re-use of the DCI format 2_6, where this type of DCI can be sent by the base station. If the UE receives it during the off period, the UE interprets its content as indicating a WUS and wakes up to perform PDCCH monitoring during the next on duration. If the UE further receives DCI format 2_6 during the on duration, the UE interprets this DCI as indicating the switching and/or skipping configuration.

As illustrated in FIG. 7, two DRX cycles are shown, an on duration of a DRX cycle is shown with crossed lines, DCI indicating WUS (e.g., format 26) in a slot is shown with a solid black rectangle, and other DCI in other slots is shown with blank rectangles.

During the on duration of a first DRX cycle (as shown to the left of FIG. 7), DCI is detected and traffic is scheduled accordingly. Thereafter and during the off duration of the first DRX cycle, no PDCCH monitoring is performed except during the MO window, in which the DCI indicating the WUS is detected at a slot, where this slot is at a power saving offset (Ps_offset) from the start of the on duration of the next DRX cycle.

During the on duration of the next DRX cycle (as shown to the right of FIG. 7), the UE wakes up to perform PDCCH monitoring given that a WUS was received. Based on this monitoring, the UE detects another DCI having the same format (e.g., a DCI that would indicate otherwise a WUS if received during the off duration, such as a DCI having format 2_6). Because it has the same format and because it is received during the on duration rather than the off duration, the UE interprets this DCI as indicating the switching and/or skipping configuration. Accordingly, the UE determines the switching period and/or skipping window based on the content of the DCI and its PDCCH monitoring configurations, and adaptively monitors the PDCCH search spaces in the remaining period of the on duration (e.g., by using the relevant switching period and/or skipping window). Whereas the first DCI indicating the WUS is sent on the PCell, the second DCI having the same format can be received on the PCell and the indicated skipping and/or switching configuration can apply to the PCell and/or SCells.

In Rel-16, DCI format 2_6 can have a higher number of bits per UE group. The RRC signaling can indicate the group to which the UE belongs. For a UE group, the DCI includes a bit field. Per bit field, one bit indicates WUS and up to five bits indicate SCell dormancy per cell group. When DCI format 2_6 is used, this DCI is repurposed to indicate the skipping and/or switching configuration without necessarily adding additional bits to the DCI. The adaptive PDCCH monitoring can apply to type three common search space (type 3 CSS).

In one example of this repurposing, the one bit WUS can be replaced with one, two, three, or "n" bits to indicate the skipping configuration and/or switching configuration from the candidate set of PDCCH monitoring configurations set up by the RRC signaling. The SCell dormancy bit(s) can be re-used to indicate the SCell group to which the indicated skipping configuration and/or switching configuration applies.

In another example of the repurposing, for each SCell group, one, two, three, or "n" bits are used in the DCI to indicate the corresponding skipping configuration and/or switching configuration. These bits are indicated in "N" bit fields, each of which corresponds to a cell group.

FIG. 8 illustrates an example of an operational flow/algorithmic structure 800 for adaptive PDCCH search space monitoring in accordance with some embodiments. The operation flow/algorithmic structure 800 may be performed or implemented by a base station such as, for example, the gNB 108 of FIG. 1, gNB 1600 of FIG. 16, or components thereof, for example, processors 1604.

The operation flow/algorithmic structure 800 may include, at 802 sending, to a user equipment (UE), radio resource control (RRC) signaling to configure a plurality of PDCCH monitoring configurations. In an example, the base station sends one or more RRC messages (e.g., RRC ConnectionReconfiguration and/or RRC Connection Setup) to the UE to set up the PDCCH configurations as a candidate set. The PDCCH configurations can include switching configurations only, skipping configurations only, or switching configurations and skipping configurations (e.g., multiple combinations, each for a switching configuration and a skipping configuration).

The operation flow/algorithmic structure 800 may include, at 804, sending, to the UE, first download control information (DCI) that indicates a PDCCH monitoring configuration of the plurality of PDCCH monitoring configurations, wherein the PDCCH monitoring configuration includes a switching configuration to indicate a PDCCH monitoring periodicity or a skipping configuration to indicate a number of slots between PDCCH search spaces. In an example, depending on whether traffic is to be scheduled for the UE, the base station sends scheduling DCI (in the case of traffic) or non-scheduling DCI (in the case of no traffic). The scheduling DCI can have format 0_1, 0_2, 11, or 1_2. The non-scheduling DCI can have format 1_1, 2_0, or 2_6.

The operation flow/algorithmic structure 800 may include, at 806, sending, to the UE, second DCI in a PDCCH search space based on the PDCCH monitoring configuration. In an example, traffic is to be scheduled for the UE. Accordingly, the base station sends scheduling DCI for this traffic. The scheduling DCI can be detected in one or more PDCCH search spaces according to the PDCCH monitoring configuration indicated at 804.

Although not illustrated in FIG. 8, the operation flow/algorithmic structure 800 may include sending additional DCI (e.g., third DCI that may be scheduling or non-scheduling) to indicate an update to the PDCCH monitoring configuration, using additional RRC signaling (e.g., sending additional RRC configurations) to indicate cell groups and/or UE groups, and/or using additional RRC signaling (e.g., sending additional RRC configurations) to indicate timers for automatically updating the switching periods and/or skipping windows.

FIG. 9 illustrates another example of an operational flow/algorithmic structure 900 for adaptive PDCCH search space monitoring in accordance with some embodiments. The operation flow/algorithmic structure 900 may be performed or implemented by a UE such as, for example, the UE 104 of FIG. 1, UE 1400 of FIG. 14, UE 1500 of FIG. 15, or components thereof, for example, processors 1504.

The operation flow/algorithmic structure 900 may include, at 902, receiving, from a base station, RRC signaling to configure a plurality of PDCCH monitoring configurations. In an example, the UE receives one or more RRC messages (e.g., RRC ConnectionReconfiguration and/or RRC Connection Setup) from the base station, where such message(s) set up the PDCCH monitoring configurations as a candidate set. The PDCCH configurations can include switching configurations only, skipping configurations only, or switching configurations and skipping configurations (e.g., multiple combinations, each for a switching configuration and a skipping configuration).

The operation flow/algorithmic structure 900 may include, at 904, receiving, from the base station, DCI. In an example, the DCI can be scheduling DCI having a format 0_1, 0_2, 1_1, or 1_2 or non-scheduling DCI having a format 1_1, 2_0, or 2_6. The DCI can be detected in one or more PDCCH search spaces during an on duration of a DRX cycle.

The operation flow/algorithmic structure 900 may include, at 906, identifying a PDCCH monitoring configuration from the plurality of PDCCH monitoring configurations based on the DCI, wherein the PDCCH monitoring configuration includes a switching configuration to indicate a PDCCH monitoring periodicity or a skipping configuration to indicate a number of slots between PDCCH search spaces. In an example, the DCI includes bits, the value of which indicates the specific PDCCH configuration from the candidate set. Given the bit values, the UE determines the specific switching period and/or skipping window to use from the candidate set.

The operation flow/algorithmic structure 900 may include, at 908, monitoring a PDCCH search space based on the PDCCH monitoring configuration. In an example, a switching configuration only is determined at operation 906, where this configuration has a particular switching period (e.g., every one slot, every two slots, etc.). The PDCCH search space is monitored during slots within one or more on duration(s) of one or more DRX cycles according to the switching period. In another example, a skipping configuration only is determined at operation 906, where this configuration has a particular skipping window (e.g., skip eight slots, etc.). The PDCCH search space is monitored across slots according to the skipping window, whereby the PDCCH monitoring is skipped during the skipping window within one or more on durations of one or more DRX cycles. In yet another example, a switching configuration and a skipping configuration are determined at operation 906. The PDCCH search space is monitored during slots within one or more on durations of one or more DRX cycles according to the switching period and skipping occurs during the on duration(s) as applicable.

Although not illustrated in FIG. 9, the operation flow/algorithmic structure 900 may include receiving and detecting additional DCI (e.g., third DCI that may be scheduling or non-scheduling) to indicate an update to the PDCCH monitoring configuration, using additional RRC signaling (e.g., receiving additional RRC configurations) to indicate cell groups and/or UE groups, and/or using additional RRC signaling (e.g., receiving additional RRC configurations) to indicate timers for automatically updating the switching periods and/or skipping windows.

FIG. 10 illustrates an example of DCI-based update for adaptive PDCCH search space monitoring in accordance with some embodiments. First DCI is used to indicate a first PDCCH monitoring configuration to use for the adaptive PDCCH monitoring, where this first PDCCH monitoring configuration can be a switching configuration only 1002, a skipping configuration only 1004, or a switching configuration and a skipping configuration 1006. Second DCI, subsequent to the first one, can be received to indicate an updated PDCCH monitoring configuration to use for the adaptive PDCCH monitoring. The updated PDCCH monitoring configuration can be of the same type indicated in the first DCI (e.g., the second DCI indicates an updated switching configuration, whereas the first DCI indicated the switching configuration 1002) or of a different type (e.g., the second DCI indicates the skipping configuration 1004, whereas the first DCI indicated the switching configuration 1002). For illustrative purposes, FIG. 10 shows that the second DCI indicates the same type of PDCCH monitoring configuration as the first one.

In an example, the first DCI indicates the switching configuration 1002 and is detected in a PDCCH search space within a slot during an on duration of a DRX cycle. Its bits indicate the switching period from a candidate set of switching configurations signaled in an RRC message. This switching period can remain in effect across different DRX cycles until the second DCI is received and indicates the updated switching configuration. In the illustration of FIG. 10, the updated switching configuration has a shorter switching period relative to the switching configuration 1002, although a longer switching period can be used depending on the traffic (e.g., denser traffic can result in a shorter switching period, and sparser traffic can result in a longer switching period).

In another example, the first DCI indicates the skipping configuration 1004 and is detected in a PDCCH search space within a slot during an on duration of a DRX cycle. Its bits indicate the skipping window from a candidate set of skipping configurations signaled in an RRC message. The second DCI is received after the expiration of the skipping window and indicates an updated skipping configuration. This DCI is also detected in a PDCCH search space within a slot during an on duration of a DRX cycle. In the illustration of FIG. 10, the updated skipping configuration has a relatively shorter skipping window, although a longer skipping window can be used depending on the traffic (e.g., denser traffic can result in a shorter skipping window, and sparser traffic can result in a longer skipping window).

In another example, the first DCI indicates the switching configuration and skipping configuration 1006 and is detected in a PDCCH search space within a slot during an on duration of a DRX cycle. Its bits indicate the switching period and the skipping window from a candidate set of skipping configurations signaled in an RRC message. In the illustration of FIG. 10, the PDCCH monitoring is not performed during the skipping window within an on duration of a DRX cycle and is performed at the switching period during the on duration or another on duration. The second DCI is subsequently received and indicates an updated switching configuration and/or skipping configuration. This DCI is also detected in a PDCCH search space within a slot during an on duration of a DRX cycle. In the illustration of FIG. 10, the updated skipping configuration has a relatively longer switching period and a longer skipping window, although a different combination of switching period and skipping window can be used.

Figure 13:
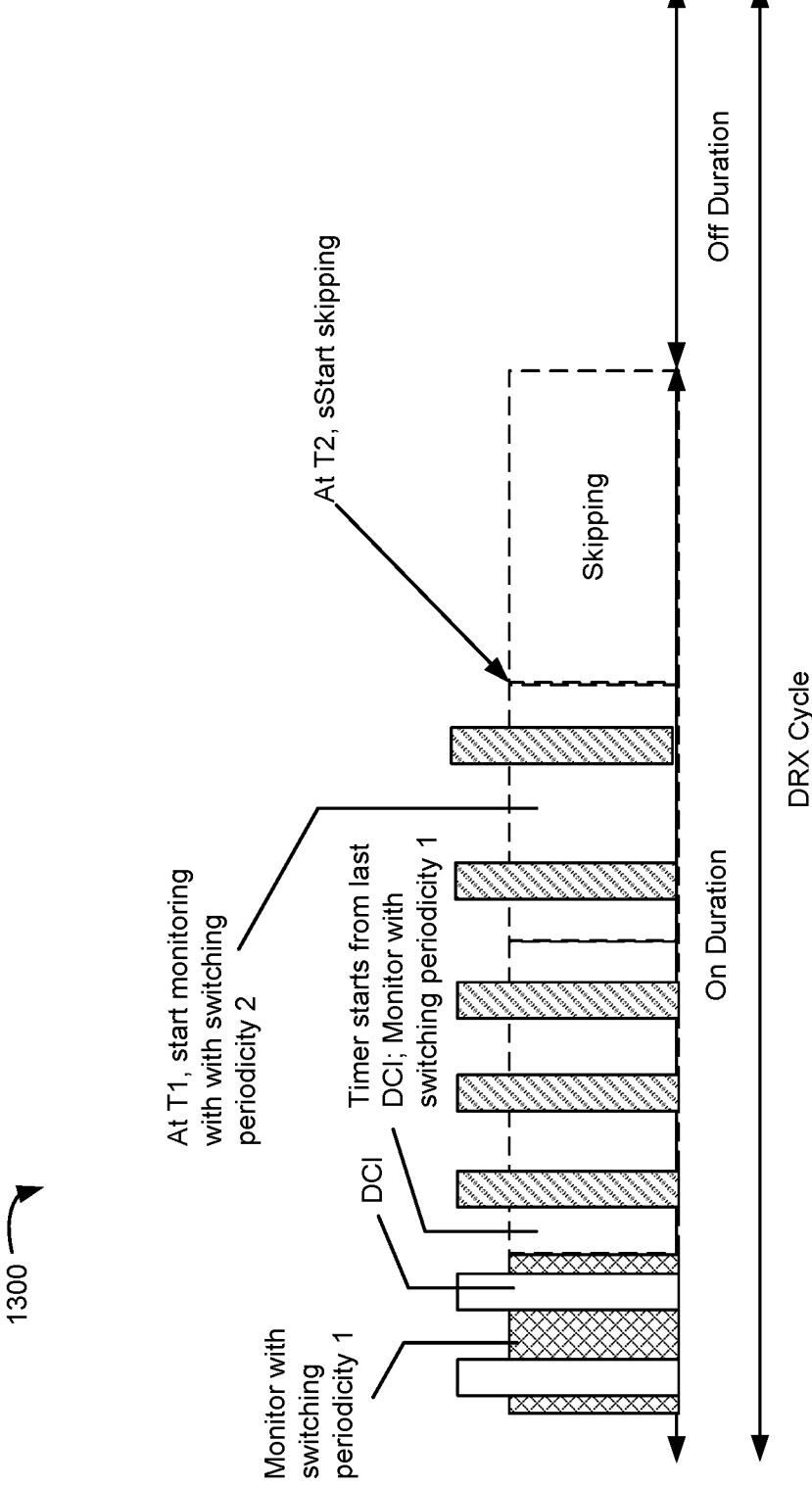
FIG. 13 illustrates yet another example of timer-based update for adaptive PDCCH search space monitoring in accordance with some embodiments.

FIGS. 11-13 illustrate examples of timer-based update for adaptive PDCCH search space monitoring in accordance with some embodiments. Timer is mainly used for the case where there is no DL or UL scheduling. In comparison to FIG. 10, rather than using second non-scheduling DCI to indicate an updated PDCCH monitoring configuration, a timer is used such that the UE can automatically determine the updated PDCCH monitoring configuration. The value of the timer can be indicated via RRC signaling (e.g., in RRC ConnectionReconfiguration and/or RRC Connection Setup) or can be pre-programmed in logic or program code of the UE based on a predefined configuration (e.g., as set in an NR wireless standard).

FIG. 11 illustrates an example of timer-based update 1100 for adaptive PDCCH search space monitoring in accordance with some embodiments. Here, the DCI triggers skipping (e.g., the first DCI indicates the skipping configuration 1004, as in FIG. 10). Subsequently, the expiration of the timer triggers a renewal of the skipping. Although the renewal is shown as re-using the same length for the skipping window, the embodiments are not limited as such. For instance, a longer skipping window can be used, whereby the next longest skipping window can be selected from the candidate set of skipping configurations.

In an example, a DRX cycle includes an on duration and an off duration. During the off duration, no PDCCH monitoring is performed. During the on duration (as illustrated in FIG. 11 with the crossed lines), PDCCH monitoring is performed, where this monitoring includes skipping. In particular, PDCCH monitoring is performed with a switching periodicity (e.g., every one slot). DCI is detected and indicates the skipping window. Accordingly, a number of slots during the one duration are skipped. From the end of the skipping window, the UE starts a timer and resumes the PDCCH monitoring at the same switching period or at a different switching period (FIG. 11 illustrates a longer switching period). If a different switching period is used, it can be indicated in the same DCI that triggered the skipping. The PDCCH monitoring continues until the expiration of the timer (e.g., the timer has a configured value, and a countdown is performed using the configured value as the countdown starting value). If no DCI is detected while the timer is running, the UE can re-start the skipping during the on duration. If DCI is detected while the timer is running, the UE resets the timer and restarts counting. This type of skipping, followed by an attempt to detect DCI at a particular switching periodicity can be repeated for the remaining length of the on duration and during one or more on durations of one or more other DRX cycles.

FIG. 12 illustrates another example of timer-based update 1200 for adaptive PDCCH search space monitoring in accordance with some embodiments. Here, the DCI triggers switching. Subsequently, the expiration of the timer triggers skipping. The switching period and the skipping window can be selected from a candidate set of switching configurations and skipping configuration based on the indication in the DCI.

In an example, a DRX cycle includes an on duration and an off duration. During the off duration, no PDCCH monitoring is performed. During the on duration (as illustrated in FIG. 12 with the crossed lines), PDCCH monitoring is performed, where this switching is followed by, as applicable, skipping. In particular, PDCCH monitoring is initially performed with a first switching periodicity (e.g., every one slot). DCI is detected and indicates a second switching periodicity (e.g., every four slots). Hence, the PDCCH monitoring continues according to the second switching periodicity. The UE also starts the timer at the slot where the second switching periodicity is used or at the slot where the DCI was sent (or received, or the last slot PDCCH was received). The PDCCH monitoring continues until the expiration of the timer (e.g., the timer has a configured value "T1", and a countdown is performed using "T1" as the countdown starting value). If no DCI is detected while the timer is running, the UE can start skipping by using a skipping window. If DCI is detected while the timer is running, the UE resets the timer. The skipping can continue or can be repeated for the remaining length of the on duration and during one or more on durations of one or more other DRX cycles. Alternatively, the skipping can be followed by switching (at the same switching periodicity, or an incrementally increased switching periodicity), where the skipping and switching can be repeated for the remaining length of the on duration and during one or more on durations of one or more other DRX cycles.

FIG. 13 illustrates yet another example of timer-based update 1300 for adaptive PDCCH search space monitoring in accordance with some embodiments. Here, the DCI triggers switching. Subsequently, a first expiration of the timer triggers additional switching at an updated switching period. Thereafter, a second expiration of the timer triggers skipping. The updated switching period and the skipping window can be selected from a candidate set of switching configurations and skipping configuration. For instance, the updated switching period can be the next longest switching period, whereas the skipping window can be indicated by the DCI. Although the timer is re-used, another timer having a different time length can be alternatively used.

In an example, a DRX cycle includes an on duration and an off duration. During the off duration, no PDCCH monitoring is performed. During the on duration (as illustrated in FIG. 13 with the crossed lines), PDCCH monitoring is performed, where this switching is followed by, as applicable, updated switching and skipping. In particular, PDCCH monitoring is initially performed with a first switching periodicity (e.g., every one slot). DCI is detected and indicates a second switching periodicity (e.g., every four slots). Here, the PDCCH monitoring continues according to the first switching periodicity. The UE also starts the timer at the slot where the DCI was sent (or received, or the last slot PDCCH was received). The PDCCH monitoring continues until the expiration of a first value "T1" of the timer (e.g., the timer has the configured value "T1", and a countdown is performed using the "T1" as the countdown starting value). If no DCI is detected while the timer is running, the UE can switch at "T1" to using a second switching period. If DCI is detected while the timer is running, the UE resets timer. This second switching period can be determined from the candidate set based on the DCI. For instance, the DCI can indicate the second switching period. Alternatively, the DCI indicates the first switching period and the second switching period is selected as the next longest switching period that can be used. Next, the PDCCH monitoring continues according to the second switching periodicity. Here also, the UE also restarts the timer (or, equivalently, starts a second timer) at the slot where the second switching periodicity is used. The value of the timer (or the second timer) is "T2," where "T2" is typically longer than "T1". The PDCCH monitoring continues until the expiration of the second value "T2" (e.g., a second countdown is performed using the "T2" as the countdown starting value). If no DCI is detected while the timer (or the second timer) is running, the UE can start skipping by using a skipping window. The skipping can continue or can be repeated for the remaining length of the on duration and during one or more on durations of one or more other DRX cycles. Alternatively, the skipping can be followed by yet another switching (at the same switching periodicity, or an incrementally increased switching periodicity), where the skipping and switching can be repeated for the remaining length of the on duration and during one or more on durations of one or more other DRX cycles.

Figure 14:
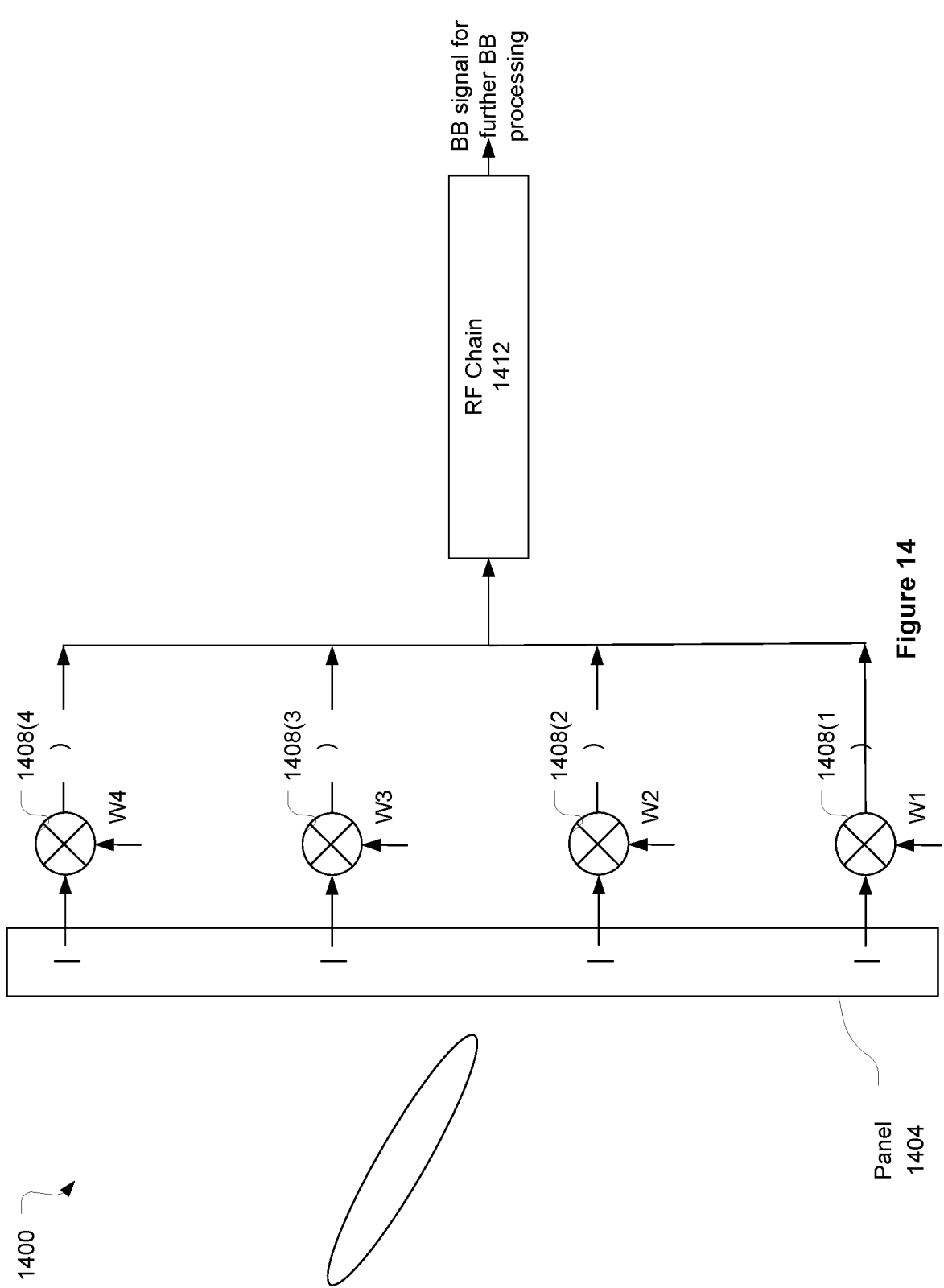
FIG. 14 illustrates an example of receive components in accordance with some embodiments.

FIG. 14 illustrates receive components 1400 of the UE 104 in accordance with some embodiments. The receive components 1400 may include an antenna panel 1404 that includes a number of antenna elements. The panel 1404 is shown with four antenna elements, but other embodiments may include other numbers.

The antenna panel 1404 may be coupled to analog beam-forming (BF) components that include a number of phase shifters 1408(1)-1408(4). The phase shifters 1408(1)-1408 (4) may be coupled with a radio-frequency (RF) chain 1412. The RF chain 1412 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1408(1)-1408(4) to provide a receive beam at the antenna panel 1404. These BF weights may be determined based on the channel-based beamforming.

Figure 15:
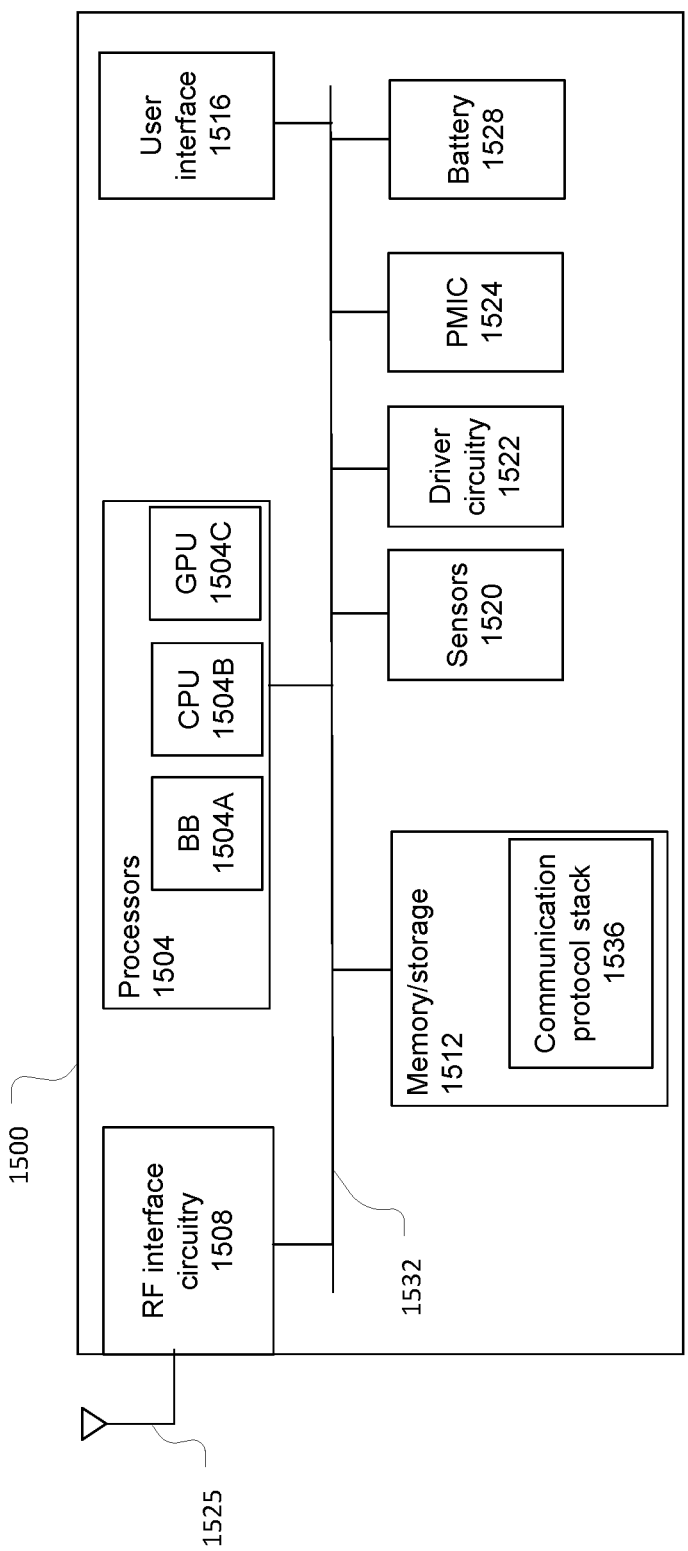
FIG. 15 illustrates an example of a UE in accordance with some embodiments.

FIG. 15 illustrates a UE 1500 in accordance with some embodiments. The UE 1500 may be similar to and substantially interchangeable with UE 154 of FIG. 1.

Similar to that described above with respect to UE 154, the UE 1500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; relaxed-IoT devices. In some embodiments, the UE may be a reduced capacity UE or NR-Light UE.

The UE 1500 may include processors 1504, RF interface circuitry 1508, memory/storage 1512, user interface 1516, sensors 1520, driver circuitry 1522, power management integrated circuit (PMIC) 1524, and battery 1528. The components of the UE 1500 may be implemented as integrated circuits (ICs), portions thereof, discrete electronic devices, or other modules, logic, hardware, software, firmware, or a combination thereof. The block diagram of FIG. 15 is intended to show a high-level view of some of the components of the UE 1500. However, some of the components shown may be omitted, additional components may be present, and different arrangement of the components shown may occur in other implementations.

The components of the UE 1500 may be coupled with various other components over one or more interconnects 1532, which may represent any type of interface, input/output, bus (local, system, or expansion), transmission line, trace, optical connection, etc. that allows various circuit components (on common or different chips or chipsets) to interact with one another.

The processors 1504 may include processor circuitry such as, for example, baseband processor circuitry (BB) 1504A, central processor unit circuitry (CPU) 1504B, and graphics processor unit circuitry (GPU) 1504C. The processors 1504 may include any type of circuitry or processor circuitry that executes or otherwise operates computer-executable instructions, such as program code, software modules, or functional processes from memory/storage 1512 to cause the UE 1500 to perform operations as described herein.

In some embodiments, the baseband processor circuitry 1504A may access a communication protocol stack 1536 in the memory/storage 1512 to communicate over a 3GPP compatible network. In general, the baseband processor circuitry 1504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1508.

The baseband processor circuitry 1504A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The baseband processor circuitry 1504A may also access group information from memory/storage 1512 to determine search space groups in which a number of repetitions of a PDCCH may be transmitted.

The memory/storage 1512 may include any type of volatile or non-volatile memory that may be distributed throughout the UE 1500. In some embodiments, some of the memory/storage 1512 may be located on the processors 1504 themselves (for example, L1 and L2 cache), while other memory/storage 1512 is external to the processors 1504 but accessible thereto via a memory interface. The memory/storage 1512 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1508 may include transceiver circuitry and radio frequency front module (RFEM) that allows the UE 1500 to communicate with other devices over a radio access network. The RF interface circuitry 1508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1525 and proceed to filter and amplify (with a low-noise amplifier) the signal. The signal may be provided to a receiver of the transceiver that down-converts the RF signal into a baseband signal that is provided to the baseband processor of the processors 1504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1525.

In various embodiments, the RF interface circuitry 1508 may be configured to transmit/receive signals in a manner compatible with NR access technologies.

The antenna 1525 may include a number of antenna elements that each convert electrical signals into radio waves to travel through the air and to convert received radio waves into electrical signals. The antenna elements may be arranged into one or more antenna panels. The antenna 1525 may have antenna panels that are omnidirectional, directional, or a combination thereof to enable beamforming and multiple input, multiple output communications. The antenna 1525 may include microstrip antennas, printed antennas fabricated on the surface of one or more printed circuit boards, patch antennas, phased array antennas, etc. The antenna 1525 may have one or more panels designed for specific frequency bands including bands in FR1 or FR2.

The user interface circuitry 1516 includes various input/output (I/O) devices designed to enable user interaction with the UE 1500. The user interface 1516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1500.

The sensors 1520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 1522 may include software and hardware elements that operate to control particular devices that are embedded in the UE 1500, attached to the UE 1500, or otherwise communicatively coupled with the UE 1500. The driver circuitry 1522 may include individual drivers allowing other components to interact with or control various input/output (I/O) devices that may be present within, or connected to, the UE 1500. For example, driver circuitry 1522 may include a display driver to control and allow access to a display device, a touchscreen driver to control and allow access to a touchscreen interface, sensor drivers to obtain sensor readings of sensor circuitry 1520 and control and allow access to sensor circuitry 1520, drivers to obtain actuator positions of electro-mechanic components or control and allow access to the electro-mechanic components, a camera driver to control and allow access to an embedded image capture device, audio drivers to control and allow access to one or more audio devices.

The PMIC 1524 may manage power provided to various components of the UE 1500. In particular, with respect to the processors 1504, the PMIC 1524 may control power-source selection, voltage scaling, battery charging, or DC-to-DC conversion.

In some embodiments, the PMIC 1524 may control, or otherwise be part of, various power saving mechanisms of the UE 1500. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1500 may power down for brief intervals of time and thus save power. If there is no data traffic activity for an extended period of time, then the UE 1500 may transition off to an RRC_Idle state, where it disconnects from the network and does not perform operations such as channel quality feedback, handover, etc. The UE 1500 goes into a very low power state and it performs paging where again it periodically wakes up to listen to the network and then powers down again. The UE 1500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1528 may power the UE 1500, although in some examples the UE 1500 may be mounted deployed in a fixed location, and may have a power supply coupled to an electrical grid. The battery 1528 may be a lithium ion battery, a metal-air battery, such as a zinc-air battery, an aluminum-air battery, a lithium-air battery, and the like. In some implementations, such as in vehicle-based applications, the battery 1528 may be a typical lead-acid automotive battery.

Figure 16:
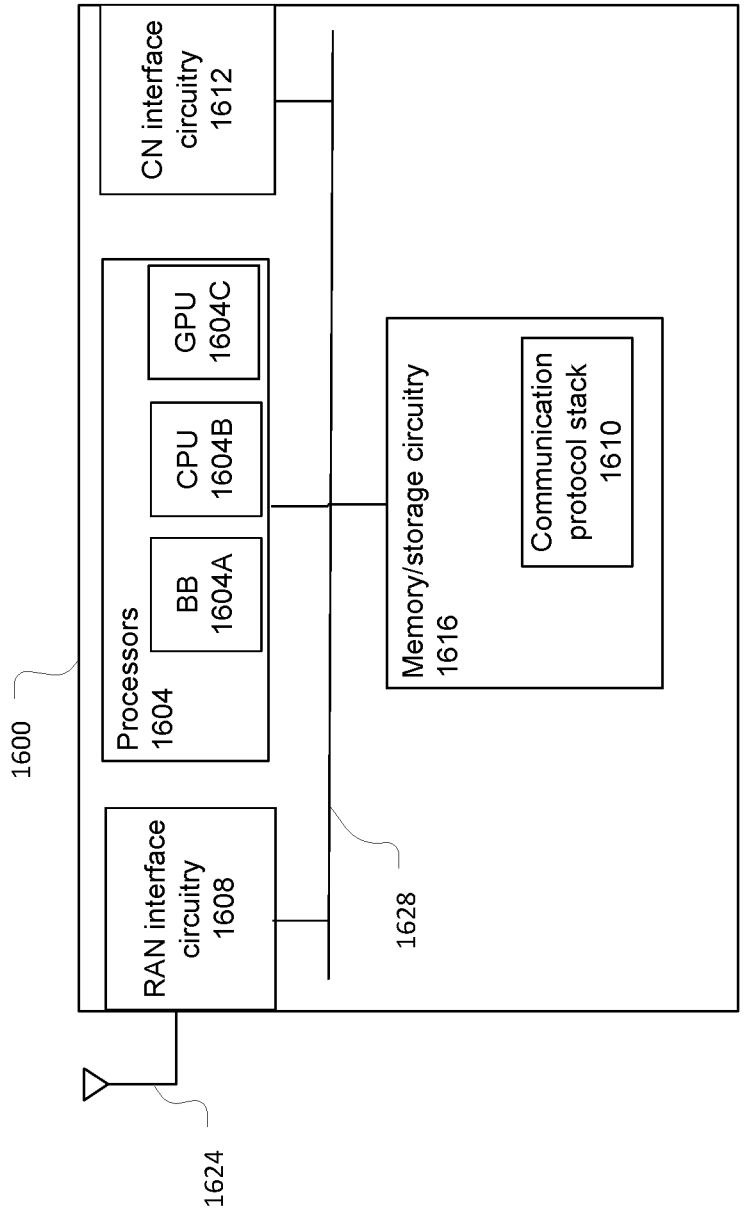
FIG. 16 illustrates an example of a base station in accordance with some embodiments.

FIG. 16 illustrates a gNB 1600 in accordance with some embodiments. The gNB node 1600 may similar to and substantially interchangeable with gNB 108. A base station, such as the base station 162, can have the same or similar components as the gNB 1600.

The gNB 1600 may include processors 1604, RF interface circuitry 1608, core network (CN) interface circuitry 1612, and memory/storage circuitry 1616.

The components of the gNB 1600 may be coupled with various other components over one or more interconnects 1628.

The processors 1604, RF interface circuitry 1608, memory/storage circuitry 1616 (including communication protocol stack 1610), antenna 1624, and interconnects 1628 may be similar to like-named elements shown and described with respect to FIG. 10.

The CN interface circuitry 1612 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the gNB 1600 via a fiber optic or wireless backhaul. The CN interface circuitry 1612 may include one or more dedicated processors or FPGAs to communicate using one or more of the aforementioned protocols. In some implementations, the CN interface circuitry 1612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method. The method is implemented by a user equipment (UE), the method comprising: receiving, from a base station, radio resource control (RRC) signaling to configure a plurality of physical downlink control channel (PDCCH) monitoring configurations; receiving, from the base station, downlink control information (DCI); identifying a PDCCH monitoring configuration from the plurality of PDCCH monitoring configurations based on the DCI, wherein the PDCCH monitoring configuration includes a switching configuration to indicate a PDCCH monitoring periodicity or a skipping configuration to indicate a number of slots between PDCCH search spaces; and monitoring a PDCCH search space based on the PDCCH monitoring configuration.

Example 2 includes a method of example 1, wherein the plurality of PDCCH monitoring configurations include switching configurations only, the DCI is first DCI, the PDCCH monitoring configuration is a first switching configuration from the switching configurations, the PDCCH search space is a first PDCCH search space, and the method further comprises: monitoring the first PDCCH search space based on a PDCCH monitoring periodicity of the first switching configuration receiving, from the base station, second DCI; determining, based on the second DCI, a second switching configuration from the switching configurations; and monitoring a second PDCCH search space based on the second switching configuration.

Example 3 includes a method of example 2, wherein a number of bits of the first DCI corresponds to a number of the switching configurations.

Example 4 includes a method of example 1, wherein the plurality of PDCCH monitoring configurations include skipping configurations only, the DCI is first DCI, the PDCCH monitoring configuration is a first skipping configuration from the skipping configurations, the PDCCH search space is a first PDCCH search space, and the method further comprises: monitoring the first PDCCH search space based on a number of slots between PDCCH search spaces of the first skipping configuration; receiving, from the base station, second DCI; determining, based on the second DCI, a second skipping configuration from the skipping configurations; and monitoring a second PDCCH search space based on the second skipping configuration.

Example 5 includes a method of example 4, wherein a number of bits of the first DCI corresponds to a number of the skipping configurations.

Example 6 includes a method of example 1, wherein the PDCCH monitoring configuration includes the switching configuration and the skipping configuration, and wherein the PDCCH search space is monitored based on the PDCCH monitoring periodicity of the switching configuration and based on the number of slots between PDCCH search spaces of the skipping configuration.

Example 7 includes a method of example 6, wherein the DCI is first DCI, the PDCCH search space is a first PDCCH search space, the PDCCH monitoring configuration is a first PDCCH monitoring configuration, and the method further comprises: receiving, from the base station, second DCI; determining, based on the second DCI, a second PDCCH monitoring configuration from the plurality of PDCCH monitoring configurations; and monitoring a second PDCCH search space based on the second PDCCH monitoring configuration.

Example 8 includes a method of any preceding example 6 through 7, wherein a first bit of the first DCI indicates the switching configuration, and wherein a second bit of the first DCI indicates the skipping configuration based on the switching configuration.

Example 9 includes a method of any preceding example, wherein the DCI is received on a component carrier, and wherein the PDCCH search space is monitored on the component carrier only.

Example 10 includes a method of any preceding example, wherein the DCI is received on a component carrier, and wherein the PDCCH search space is monitored on a different component carrier.

Example 11 includes a method of any preceding example, wherein the method further comprises: receiving, from the base station, an RRC configuration indicating a group of component carriers to which the plurality of PDCCH monitoring configurations apply; and monitoring, for each component carrier of the group, a corresponding PDCCH search space based on the PDCCH monitoring configuration.

Example 12 includes a method of example 11, wherein at least two of the component carriers of the group have different subcarrier spacing (SCS), and the method further comprises: determining, based on the smallest SCS of the component carriers of the group, an updated PDCCH monitoring periodicity or an updated number of slots between PDCCH search spaces, wherein monitoring, for each component carrier of the group, the corresponding PDCCH search space is based on the updated PDCCH monitoring periodicity or the updated number of slots.

Example 13 includes a method of any preceding example, wherein the DCI has a format that indicates the PDCCH monitoring configuration and secondary cell (SCell) dormancy.

Example 14 includes a method of example 13, wherein the DCI includes a bitmap that indicates, per cell, a corresponding PDCCH monitoring configuration from the plurality of PDCCH monitoring configurations, and wherein the method further comprises: monitoring, for each cell, a corresponding PDCCH search space based on the corresponding PDCCH monitoring configuration.

Example 15 includes a method of example 13, wherein the method further comprises: receiving, from the base station, an RRC configuration indicating cell groups to which the plurality of PDCCH monitoring configurations apply, wherein the DCI includes a bitmap that indicates, for each one of the cell groups, a corresponding PDCCH monitoring configuration from the plurality of PDCCH monitoring configurations; determining, for a cell group of the cell groups, the corresponding PDCCH monitoring configuration indicated by the bitmap; and monitoring, for each cell in the cell group, a corresponding PDCCH search space based on the corresponding PDCCH monitoring configuration of the cell group.

Example 16 includes a method of any preceding example, wherein the DCI is first DCI, and the method further comprises: receiving, from the base station and prior to an on duration of a discontinuous reception (DRX) cycle, second DCI that has a format and that indicates a wake-up signal (WUS), and wherein the first DCI has the format and is received during the on duration based on the WUS.

Example 17 includes a method of example 16, wherein the second DCI is received on a primary cell (PCell), and wherein the PDCCH search space is monitored on the PCell or a secondary cell (SCell).

Example 18 includes a method of any preceding example 16 through 17, wherein the first DCI indicates that the PDCCH monitoring configuration applies to a plurality of cell groups.

Example 19 includes a method of any preceding example 16 through 17, wherein the PDCCH monitoring configuration is a first PDCCH monitoring configuration, the first DCI indicates that the first PDCCH monitoring configuration applies to a first group of cells and that a second PDCCH monitoring configuration from the plurality of PDCCH monitoring configurations applies to a second group of cells.

Example 20 includes a method of any preceding example, wherein the method further comprises: receiving, from the base station, an RRC configuration that indicates a UE group and a bit field location for the UE, wherein the DCI indicates the PDCCH monitoring configuration for the UE at the bit field location.

Example 21 includes a method of any preceding example, wherein the method further comprises: receiving, from the base station, an RRC configuration that indicates a UE group, wherein the DCI indicates the PDCCH monitoring configuration specifically to the UE of the UE group.

Example 22 includes a method of any preceding example, wherein the method further comprises: receiving, from the base station, an RRC configuration that indicates a UE group, wherein the DCI indicates the PDCCH monitoring configuration for the UE group.

Example 23 includes a method of any preceding example, wherein the method further comprises: skipping the monitoring of the PDCCH search space during a slot window having a length equal to the number of slots; starting a timer from an end of the slot window; determining that no DCI was received prior to an expiration of the timer, wherein PDCCH search space is found after the slot window and the PDCCH search space is monitored prior to the expiration of the timer; and skipping, after the expiration of the timer, the monitoring of the PDCCH search space during a next slot window.

Example 24 includes a method of any preceding example, wherein the PDCCH search space is monitored by at least: monitoring the PDCCH search space at a first slot based on the PDCCH monitoring periodicity; determining that no DCI was received at the first slot; starting a timer after the first slot; continuing, prior to an expiration of the timer, monitoring the PDCCH search space at slots based on the PDCCH monitoring periodicity; determining whether second DCI was received prior to the expiration of the timer; and skipping, after the expiration of the timer and upon a determination that no second DCI was received, the monitoring of the PDCCH search space during a next slot window having a length equal to the number of slots; or resetting the timer upon a determination that the second DCI was received.

Example 25 includes a method of any preceding example, wherein the PDCCH search space is monitored by at least: monitoring the PDCCH search space at a first slot based on the PDCCH monitoring periodicity; determining that no DCI was received at the first slot; starting a first timer after the first slot; continuing, prior to an expiration of the first timer, monitoring the PDCCH search space based on the PDCCH monitoring periodicity; determining that no DCI was received prior to the expiration of the first timer; starting a second timer after the expiration of the first timer; and continuing, prior to an expiration of the second timer, monitoring the PDCCH search space based on a different PDCCH monitoring periodicity, wherein the different PDCCH monitoring periodicity is from a different switching configuration of the plurality of PDCCH monitoring configurations.

Example 26 includes a method of example 25, wherein the PDCCH search space is further monitored by at least: determining that no DCI was received prior to the expiration of the second timer; and skipping, after the expiration of the second timer, the monitoring of the PDCCH search space during a next slot window having a length equal to the number of slots.

Example 27 includes a method of example 1, wherein a number of bits in the DCI indicates at least one of the switching configuration or the skipping configuration.

Example 28 includes a method of example 27, wherein the number of bits is two

Example 29 includes a method of example 27, wherein the DCI has a DCI format of 1_1.

Example 31 includes a method of example 1, wherein the plurality of PDCCH monitoring configurations include a plurality of switching configurations, and wherein a number of bits in the DCI indicates the switching configuration of the plurality of switching configurations.

Example 32 includes a method of example 1, wherein the plurality of PDCCH monitoring configurations include a plurality of skipping configurations, and wherein a number of bits in the DCI indicates the skipping configuration of the plurality of skipping configurations.

Example 33 includes a method of example 1, wherein the plurality of PDCCH monitoring configurations include a plurality of skipping configurations and a plurality of switching configuration, and wherein a number of bits in the DCI indicates the skipping configuration and the switching configuration.

Example 34 includes a method of example 33, wherein the number of bits includes a first number of bits and a second number of bits, wherein the first number of bits indicates the skipping configuration and wherein the second number of bits indicates the switching configuration Example 35 includes a method of example 34, the second number of bits indicates the switching configuration depending on the skipping configuration.

Example 36 includes a method. The method is implemented by a base station, the method comprising: sending, to a user equipment (UE), radio resource control (RRC) signaling to configure a plurality of physical downlink control channel (PDCCH) monitoring configurations; sending, to the UE, first download control information (DCI) that indicates a PDCCH monitoring configuration of the plurality of PDCCH monitoring configurations, wherein the PDCCH monitoring configuration includes a switching configuration to indicate a PDCCH monitoring periodicity or a skipping configuration to indicate a number of slots between PDCCH search spaces; and sending, to the UE, second DCI in a PDCCH search space based on the PDCCH monitoring configuration.

Example 37 includes a method of example 27, wherein the plurality of PDCCH monitoring configurations include switching configurations only, the PDCCH monitoring configuration is a first switching configuration from the switching configurations, the PDCCH search space is a first PDCCH search space, and the method further comprises: sending, to the UE, third DCI that indicates a second switching configuration from the switching configurations; and sending, to the UE, fourth DCI in a second PDCCH space based on the second switching configuration.

Example 38 includes a method of example 28, wherein a number of bits of the first DCI corresponds to a number of the switching configurations.

Example 39 includes a method of example 27, wherein the plurality of PDCCH monitoring configurations include skipping configurations only, the PDCCH monitoring configuration is a first skipping configuration from the skipping configurations, the PDCCH search space is a first PDCCH search space, and the method further comprises: sending, to the UE, third DCI that indicates a second skipping configuration from the plurality of skipping configurations; and sending, to the UE, fourth DCI in a second PDCCH space based on the second skipping configuration.

Example 40 includes a method of example 30, wherein a number of bits of the first DCI corresponds to a number of the skipping configurations.

Example 41 includes a method of example 27, wherein the PDCCH monitoring configuration includes the switching configuration and the skipping configuration, and wherein the PDCCH search space is monitored based on the PDCCH monitoring periodicity of the switching configuration and based on the number of slots between PDCCH search spaces of the skipping configuration.

Example 42 includes a method of example 32, wherein the PDCCH search space is a first PDCCH search space, the PDCCH monitoring configuration is a first PDCCH monitoring configuration, and the method further comprises: sending, to the UE, third DCI that indicates a second PDCCH monitoring configuration from the plurality of PDCCH monitoring configurations; and sending, to the UE, fourth DCI in a second PDCCH space based on the second PDCCH monitoring configuration.

Example 43 includes a method of any preceding example 32 through 33, wherein a first bit of the first DCI indicates the switching configuration, and wherein a second bit of the first DCI indicates the skipping configuration based on the switching configuration.

Example 44 includes a method of any preceding example 27 through 34, wherein the first DCI is sent on a component carrier, and wherein the PDCCH search space is monitored on the component carrier only.

Example 45 includes a method of any preceding example 27 through 35, wherein the first DCI is sent on a component carrier, and wherein the PDCCH search space is monitored on a different component carrier.

Example 46 includes a method of any preceding example 27 through 36, wherein the method further comprises: sending, to the UE, an RRC configuration indicating a group of component carriers to which the plurality of PDCCH monitoring configurations apply, wherein, for each component carrier of the group, a corresponding PDCCH search space is monitored based on the PDCCH monitoring configuration.

Example 47 includes a method of any preceding example 27 through 37, wherein the first DCI has a format that indicates the PDCCH monitoring configuration and secondary cell (SCell) dormancy.

Example 48 includes a method of example 38, wherein the first DCI includes a bitmap that indicates, per cell, a corresponding PDCCH monitoring configuration from the plurality of PDCCH monitoring configurations.

Example 49 includes a method of example 38, wherein the method further comprises: sending, to the UE, an RRC configuration indicating cell groups to which the plurality of PDCCH monitoring configurations apply, wherein the first DCI includes a bitmap that indicates, for each one of the cell groups, a corresponding PDCCH monitoring configuration from the plurality of PDCCH monitoring configurations.

Example 50 includes a method of any preceding example 27 through 40, wherein the method further comprises: sending, to the UE and prior to an on duration of a discontinuous reception (DRX) cycle, third DCI that has a format and that indicates a wake-up signal (WUS), and wherein the first DCI has the format and is sent during the on duration.

Example 51 includes a method of example 41, wherein the third DCI is sent on a primary cell (PCell), and wherein the PDCCH search space is monitored on the PCell or a secondary cell (SCell).

Example 52 includes a method of any preceding example 41 through 42, wherein the first DCI indicates that the PDCCH monitoring configuration applies to a plurality of cell groups.

Example 53 includes a method of any preceding example 41 through 42, wherein the PDCCH monitoring configuration is a first PDCCH monitoring configuration, the first DCI indicates that the first PDCCH monitoring configuration applies to a first group of cells and that a second PDCCH monitoring configuration from the plurality of PDCCH monitoring configurations applies to a second group of cells.

Example 54 includes a method of any preceding example 27 through 44, wherein the method further comprises: sending, to the UE, an RRC configuration that indicates a UE group and a bit field location for the UE, wherein the first DCI indicates the PDCCH monitoring configuration for the UE at the bit field location.

Example 55 includes a method of any preceding example 27 through 45, wherein the method further comprises: sending, to the UE, an RRC configuration that indicates a UE group, wherein the first DCI indicates the PDCCH monitoring configuration specifically to the UE of the UE group.

Example 56 includes a method of any preceding example 27 through 46, wherein the method further comprises: sending, to the UE, an RRC configuration that indicates a UE group, wherein the first DCI indicates the PDCCH monitoring configuration for the UE group.

Example 57 includes a method of any preceding example 27 through 36, wherein the method further comprises: determining, prior to sending the first DCI, that traffic is buffered for the UE, wherein the first DCI further indicates scheduling information for the traffic.

Example 58 includes a method of any preceding example 27 through 47, wherein the method further comprises: determining, prior to sending the first DCI, that no traffic is buffered for the UE, wherein the first DCI excludes traffic scheduling information.

Example 59 includes a method of example 36, wherein the plurality of PDCCH monitoring configurations includes a plurality of switching configurations or a plurality of skipping configurations, and wherein a number of bits in the DCI indicates the switching configuration of the plurality of switching configurations or the skipping configuration of the plurality of skipping configurations.

Example 60 includes a method of example 36, wherein the plurality of PDCCH monitoring configurations includes a plurality of switching configurations and a plurality of skipping configurations, and wherein a number of bits in the DCI indicates the switching configuration of the plurality of switching configurations and the skipping configuration of the plurality of skipping configurations.

Example 61 includes a UE comprising means to perform one or more elements of a method described in or related to any of the examples 1-35.

Example 62 includes one or more non-transitory computer-readable media comprising instructions to cause a UE, upon execution of the instructions by one or more processors of the UE, to perform one or more elements of a method described in or related to any of the examples 1-35.

Example 63 includes a UE comprising logic, modules, or circuitry to perform one or more elements of a method described in or related to any of the examples 1-35.

Example 64 includes a UE comprising: one or more processors and one or more computer-readable media comprising instructions that, when executed by the one or more processors, cause the one or more processors to perform one or more elements of a method described in or related to any of the examples 1-35.

Example 65 includes a system comprising means to perform one or more elements of a method described in or related to any of the examples 1-35.

Example 66 includes a base station comprising means to perform one or more elements of a method described in or related to any of the examples 36-60.

Example 67 includes one or more non-transitory computer-readable media comprising instructions to cause a base station, upon execution of the instructions by one or more processors of the base station, to perform one or more elements of a method described in or related to any of the examples 36-60.

Example 68 includes a base station comprising logic, modules, or circuitry to perform one or more elements of a method described in or related to any of the examples 36-60.

Example 69 includes a base station comprising: one or more processors and one or more computer-readable media comprising instructions that, when executed by the one or more processors, cause the one or more processors to perform one or more elements of a method described in or related to any of the examples 36-60.

Example 70 includes a system comprising means to perform one or more elements of a method described in or related to any of the examples 36-60.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   processing circuitry configured to:
   process radio resource control (RRC) information that indicates a plurality of physical downlink control channel (PDCCH) monitoring configurations, the plurality of PDCCH monitoring configurations including at least one of a switching configuration or a skipping configuration;
   process downlink control information (DCI) that includes a plurality of bits;
   determine a PDCCH monitoring configuration from the plurality of PDCCH monitoring configurations based on the bits and the plurality of PDCCH monitoring configurations, wherein a same value of the bits indicates the skipping configuration, the switching configuration, or a combination of the skipping configuration and the switching configuration based on whether the plurality of PDCCH monitoring configurations includes one or both of the switching configuration or the skipping configuration; and
   monitor a PDCCH search space based on the PDCCH monitoring configuration; and
   interface circuitry coupled with the processing circuitry and configured to receive RRC signaling.

2. The apparatus of claim 1, wherein a number of the bits in the DCI indicates at least one of the switching configuration or the skipping configuration.

3. The apparatus of claim 2, wherein the number of the bits is two.

4. The apparatus of claim 2, wherein the DCI has a DCI format of 1_1.

5. The apparatus of claim 1, wherein the plurality of PDCCH monitoring configurations includes a plurality of switching configurations, and wherein a number of the bits in the DCI indicates the switching configuration of the plurality of switching configurations.

6. The apparatus of claim 1, wherein the plurality of PDCCH monitoring configurations include a plurality of skipping configurations, and wherein a number of the bits in the DCI indicates the skipping configuration of the plurality of skipping configurations.

7. The apparatus of claim 1, wherein the plurality of PDCCH monitoring configurations includes a plurality of skipping configurations and a plurality of switching configuration, and wherein a number of the bits in the DCI indicates the skipping configuration and the switching configuration.

8. The apparatus of claim 7, wherein the number of the bits includes a first number of bits and a second number of bits, wherein the first number of bits indicates the skipping configuration and wherein the second number of bits indicates the switching configuration.

9. The apparatus of claim 8, the second number of bits indicates the switching configuration depending on the skipping configuration.

10. The apparatus of claim 1, wherein the PDCCH monitoring configuration includes the switching configuration and the skipping configuration, and wherein the PDCCH search space is monitored based on a PDCCH monitoring periodicity of the switching configuration and based on a number of slots between PDCCH search spaces of the skipping configuration.

11. The apparatus of claim 1, wherein the DCI is first DCI, the PDCCH search space is a first PDCCH search space, the PDCCH monitoring configuration is a first PDCCH monitoring configuration, and the processing circuitry is further configured to:

process second DCI;

determine, based on the second DCI, a second PDCCH monitoring configuration from the plurality of PDCCH monitoring configurations; and monitor a second PDCCH search space based on the second PDCCH monitoring configuration.

12. One or more non-transitory computer-readable media comprising instructions to cause, upon execution of the instructions, operations comprising:

processing radio resource control (RRC) information that indicates a plurality of physical downlink control channel (PDCCH) monitoring configurations, the plurality of PDCCH monitoring configurations including at least one of a switching configuration or a skipping configuration;

processing downlink control information (DCI) that includes a plurality of bits;

determining a PDCCH monitoring configuration from the plurality of PDCCH monitoring configurations based on the bits and the plurality of PDCCH monitoring configurations, wherein a same value of the bits indicates the skipping configuration, the switching configuration, or a combination of the skipping configuration and the switching configuration based on whether the plurality of PDCCH monitoring configurations includes one or both of the switching configuration or the skipping configuration; and monitoring a PDCCH search space based on the PDCCH monitoring configuration.

13. The one or more non-transitory computer-readable media of claim 12, wherein the DCI has a format that indicates the PDCCH monitoring configuration and secondary cell (SCell) dormancy.

14. The one or more non-transitory computer-readable media of claim 12, wherein the DCI is first DCI, and the operations further comprise: processing, prior to an on duration of a discontinuous reception (DRX) cycle, second DCI that has a format and that indicates a wake-up signal (WUS), and wherein the first DCI has the format and is received during the on duration based on the WUS.

15. A method comprising:

generating, for transmission to a user equipment (UE), radio resource control (RRC) information that indicates a plurality of physical downlink control channel (PDCCH) monitoring configurations, the plurality of PDCCH monitoring configurations including at least one of a switching configuration or a skipping configuration;

generating, for transmission to the UE, first download control information (DCI) that indicates a PDCCH monitoring configuration of the plurality of PDCCH monitoring configurations, wherein a same value of bits of the DCI indicates the skipping configuration, the switching configuration, or a combination of the skipping configuration and the switching configuration based on whether the plurality of PDCCH monitoring configurations includes one or both of the switching configuration or the skipping configuration; and generating, for transmission to the UE, second DCI in a PDCCH search space based on the PDCCH monitoring configuration.

16. The method of claim 15, wherein the plurality of PDCCH monitoring configurations includes a plurality of switching configurations or a plurality of skipping configurations, and wherein a number of the bits in the DCI indicates the switching configuration of the plurality of switching configurations or the skipping configuration of the plurality of skipping configurations.

17. The method of claim 15, wherein the plurality of PDCCH monitoring configurations includes a plurality of switching configurations and a plurality of skipping configurations, and wherein a number of the bits in the DCI indicates the switching configuration of the plurality of switching configurations and the skipping configuration of the plurality of skipping configurations.

18. The method of claim 15, wherein the first DCI is sent on a component carrier, and wherein the PDCCH search space is monitored on the component carrier or a different component carrier.

19. The method of claim 15, further comprising:

sending, to the UE, an RRC configuration indicating a group of component carriers to which the plurality of PDCCH monitoring configurations apply, wherein, for each component carrier of the group, a corresponding PDCCH search space is monitored based on the PDCCH monitoring configuration.

20. The method of claim 19, wherein the first DCI has a format that indicates the PDCCH monitoring configuration and secondary cell (SCell) dormancy.

\* \* \* \* \*